US008473860B2

(12) United States Patent
Fong et al.

(10) Patent No.: US 8,473,860 B2
(45) Date of Patent: Jun. 25, 2013

(54) MULTI-LAYER USER INTERFACE WITH FLEXIBLE PARALLEL AND ORTHOGONAL MOVEMENT

(75) Inventors: Jeffrey Cheng-Yao Fong, Seattle, WA (US); Eric J. Hull, Seattle, WA (US); Sergey Chub, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/824,049

(22) Filed: Jun. 25, 2010

(65) Prior Publication Data

US 2011/0202837 A1    Aug. 18, 2011

Related U.S. Application Data

(60) Provisional application No. 61/304,004, filed on Feb. 12, 2010.

(51) Int. Cl.
*G06F 3/00* (2006.01)
*G06F 3/048* (2006.01)

(52) U.S. Cl.
USPC ........... 715/784; 715/760; 715/768; 715/790; 715/863

(58) Field of Classification Search
CPC . G06F 17/3089; G06F 17/0486; G06F 3/0485; G09G 5/14
USPC ................. 715/863, 902, 760, 768, 784, 790; 463/1–69; 273/371–461
See application file for complete search history.

(56) References Cited

U.S. PATENT DOCUMENTS

| | | | |
|---|---|---|---|
| 5,860,073 A * | 1/1999 | Ferrel et al. | 715/255 |
| 6,469,718 B1 * | 10/2002 | Setogawa et al. | 715/810 |
| 7,032,181 B1 * | 4/2006 | Farcasiu | 715/764 |
| 7,428,709 B2 | 9/2008 | Forstall et al. | |
| 7,634,789 B2 | 12/2009 | Gerba | |
| 7,636,755 B2 * | 12/2009 | Blattner et al. | 709/206 |
| 7,690,997 B2 * | 4/2010 | Van Luchene et al. | 463/42 |
| 7,698,654 B2 * | 4/2010 | Fong et al. | 715/810 |
| 7,724,242 B2 * | 5/2010 | Hillis et al. | 345/173 |
| 7,779,360 B1 * | 8/2010 | Jones et al. | 715/764 |
| 7,958,456 B2 * | 6/2011 | Ording et al. | 715/784 |
| 8,113,951 B2 * | 2/2012 | David et al. | 463/30 |
| 8,127,246 B2 * | 2/2012 | Furches et al. | 715/787 |
| 8,171,432 B2 * | 5/2012 | Matas et al. | 715/863 |

(Continued)

OTHER PUBLICATIONS

Chris Coyier, Nov. 30, 2009, "Scroll/Follow Sidebar, Multiple Techniques", pp. 1-4.*

(Continued)

*Primary Examiner* — Boris Pesin
*Assistant Examiner* — Ece Hur
(74) *Attorney, Agent, or Firm* — Klarquist Sparkman, LLP

(57) ABSTRACT

A user interface (UI) system calculates movements in a multi-layer graphical user interface. The UI system receives user input corresponding to gestures on a touchscreen. The UI system calculates a movement of a first layer in a first direction (e.g., a horizontal direction) at a first movement rate. The UI system calculates a movement of a second layer substantially parallel to the movement of the first layer, at a second movement rate that differs from the first movement rate. The UI system calculates a movement (e.g., a vertical movement) in a direction substantially orthogonal to the first direction, in a UI element of one of the layers.

20 Claims, 24 Drawing Sheets

U.S. PATENT DOCUMENTS

| | | | |
|---|---|---|---|
| 8,214,768 B2* | 7/2012 | Boule et al. | 715/863 |
| 8,259,077 B2* | 9/2012 | Shin et al. | 345/173 |
| 2002/0135602 A1* | 9/2002 | Davis et al. | 345/684 |
| 2005/0149551 A1 | 7/2005 | Fong et al. | |
| 2006/0053048 A1* | 3/2006 | Tandetnik | 705/14 |
| 2006/0095360 A1* | 5/2006 | Apple et al. | 705/35 |
| 2006/0161863 A1* | 7/2006 | Gallo | 715/810 |
| 2006/0174214 A1* | 8/2006 | McKee et al. | 715/802 |
| 2007/0079246 A1* | 4/2007 | Morillon et al. | 715/741 |
| 2007/0150830 A1* | 6/2007 | Ording et al. | 715/784 |
| 2007/0245260 A1* | 10/2007 | Koppert | 715/784 |
| 2008/0016471 A1 | 1/2008 | Park | |
| 2008/0168349 A1* | 7/2008 | Lamiraux et al. | 715/702 |
| 2009/0007017 A1* | 1/2009 | Anzures et al. | 715/835 |
| 2009/0125836 A1* | 5/2009 | Yamamoto et al. | 715/781 |
| 2009/0204928 A1 | 8/2009 | Kallio et al. | |
| 2009/0327938 A1* | 12/2009 | Faraday et al. | 715/764 |
| 2010/0009747 A1* | 1/2010 | Reville et al. | 463/31 |
| 2010/0026698 A1* | 2/2010 | Reville et al. | 345/581 |
| 2010/0073380 A1* | 3/2010 | Kaplan et al. | 345/473 |
| 2010/0083165 A1 | 4/2010 | Andrews et al. | |
| 2010/0107068 A1* | 4/2010 | Butcher et al. | 715/702 |
| 2010/0134425 A1* | 6/2010 | Storrusten | 345/173 |
| 2010/0137031 A1* | 6/2010 | Griffin et al. | 455/566 |
| 2010/0175027 A1* | 7/2010 | Young et al. | 715/830 |
| 2011/0022985 A1* | 1/2011 | Ording et al. | 715/830 |
| 2011/0087963 A1* | 4/2011 | Brisebois et al. | 715/702 |
| 2011/0093778 A1* | 4/2011 | Kim et al. | 715/702 |
| 2011/0199318 A1* | 8/2011 | Fong et al. | 345/173 |
| 2011/0202834 A1* | 8/2011 | Mandryk et al. | 715/701 |
| 2011/0202859 A1* | 8/2011 | Fong | 715/769 |
| 2012/0144322 A1* | 6/2012 | Park | 715/760 |
| 2012/0278725 A1* | 11/2012 | Gordon et al. | 715/738 |

OTHER PUBLICATIONS

Jeff Dion, "Creating a Floating HTML Menu Using jQuery and CSS," <http://net.tutsplus.com/html-css-techniques/creating-a-floating-html-menu-using-jquery-and-css/>, 8 pages (Jun. 26, 2008).

* cited by examiner

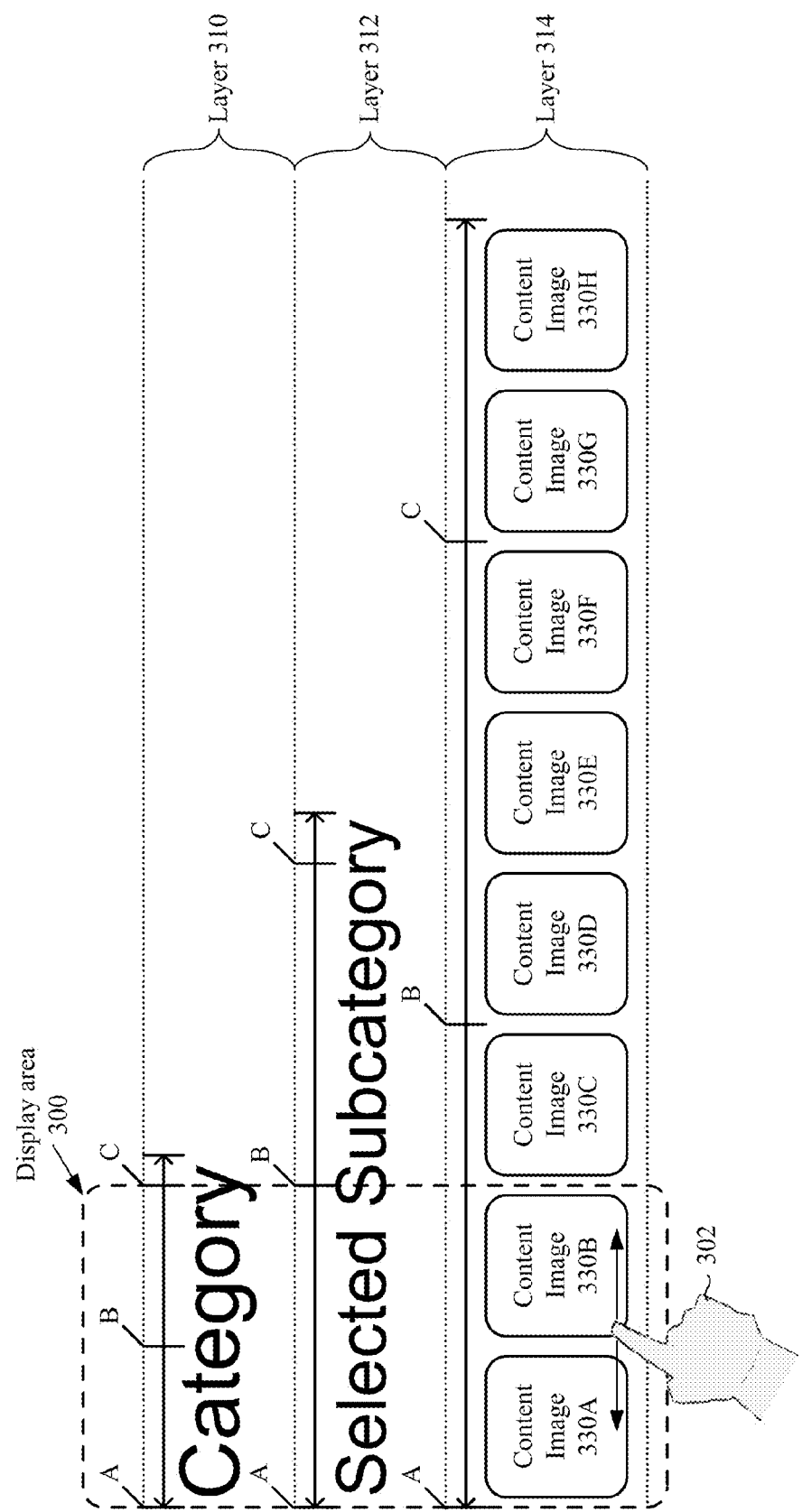

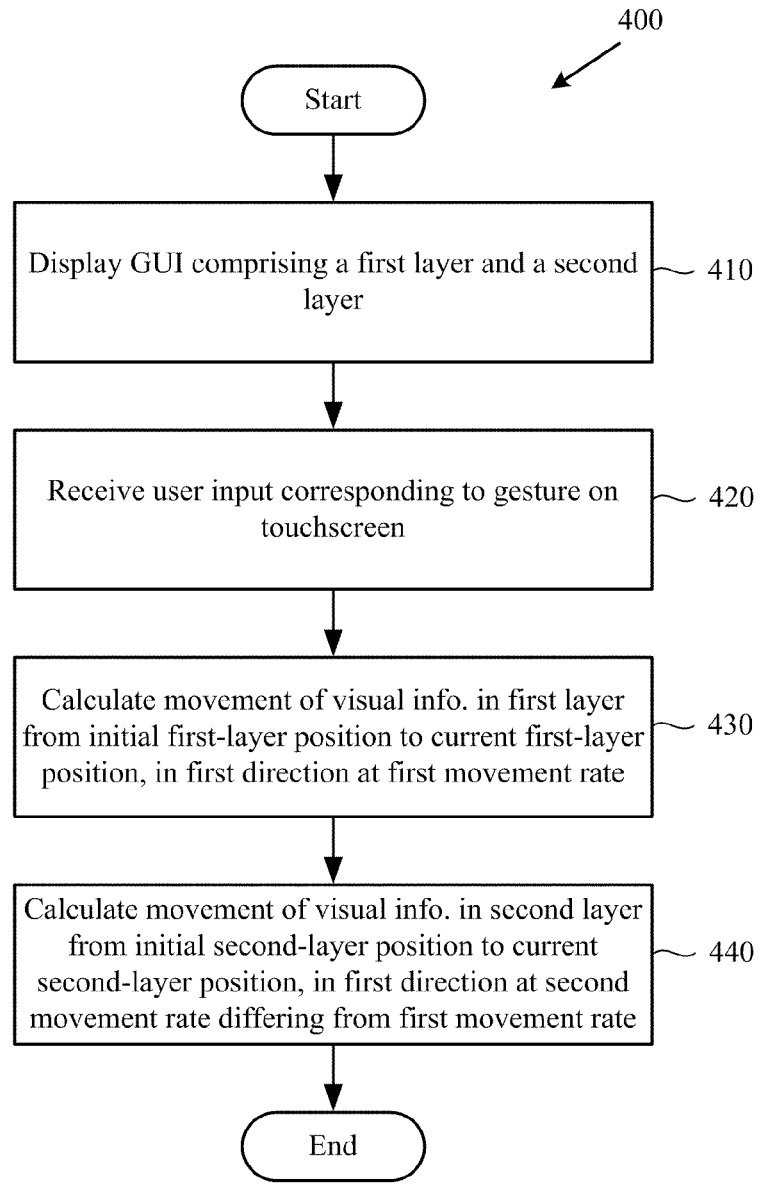

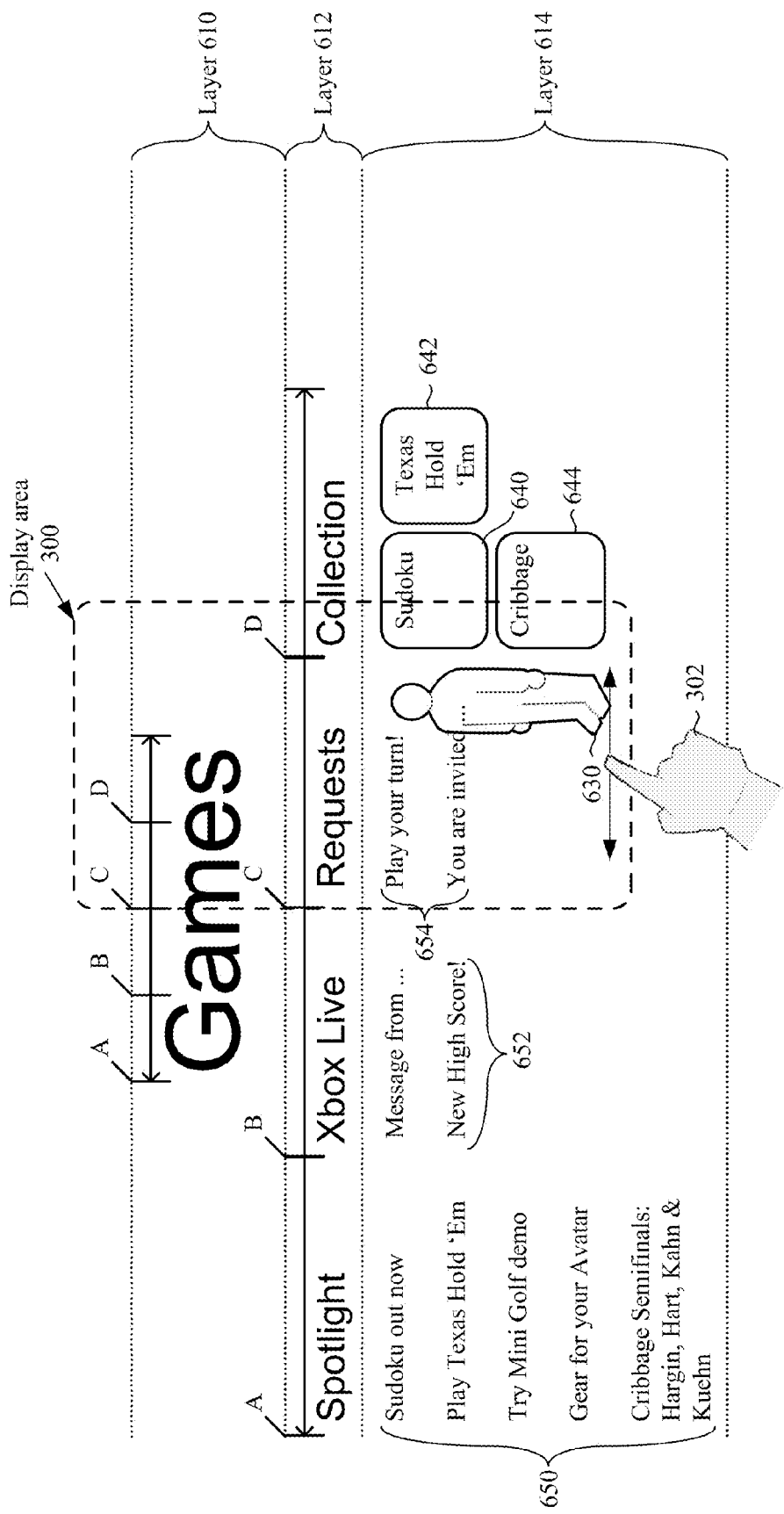

MULTI-LAYER USER INTERFACE WITH FLEXIBLE PARALLEL AND ORTHOGONAL MOVEMENT

CROSS REFERENCE TO RELATED APPLICATION

This application claims the benefit of U.S. Provisional Patent Application No. 61/304,004, filed on Feb. 12, 2010, entitled "MULTI-LAYER USER INTERFACE WITH FLEXIBLE MOVEMENT," which is incorporated herein by reference.

BACKGROUND

The design of an effective user interface poses many challenges. One challenge is how to provide a user with an optimal amount of visual information or functionality, given the space limitations of a display and the needs of a particular user. This challenge can be especially acute for devices with small displays, such as smartphones or other mobile computing devices. This is because there is often more information available to a user performing a particular activity (e.g., browsing for audio or video files in a library of files) than can fit on the display. A user can easily become lost unless careful attention is paid to how information is presented on the limited amount of available display space.

Whatever the benefits of previous techniques, they do not have the advantages of the techniques and tools presented below.

SUMMARY

Techniques and tools described herein relate to presenting visual information to users on computer displays, and more particularly relate to presenting visual information on small displays, such as those found on smartphones and other mobile computing devices. In particular, techniques and tools are described that relate to different aspects of a user interface in which layers of visual information that relate to one another move at different rates. In one implementation, the layers move in the same direction at rates that are a function of the length of the layer (which can also be referred to as the width of the layer, such as when the layer is oriented horizontally), in response to user input. For example, a graphical user interface (GUI) comprises a background layer, a title layer, and a content layer. A user navigating through the content layer in a particular direction (e.g., from left to right in a horizontal dimension) also causes movement in the same direction in one or more of the background layer and the title layer. The amount and nature of the movement in the layers depends on one or more factors, such as the data in the layers, or the relative distance between corresponding lock points in the layers. For example, if a content layer is longer than a background layer, the content layer moves faster than the background layer. The movement rate of the content layer can match with a movement rate of a gesture on a touchscreen, to give the user a sense of directly manipulating the content on the touchscreen.

In one aspect, a UI system displays a GUI comprising at least first and second layers. A first portion of visual information in the first layer is within a display area of a touchscreen. The UI system receives first user input corresponding to a first gesture on the touchscreen. The UI system calculates a first movement based at least in part on the user input, the first movement comprising a movement of the first layer from an initial first-layer position in which a second portion of visual information in the first layer is outside the display area to a current first-layer position in which the second portion of visual information in the first layer is within the display area. The first movement is in a first direction at a first movement rate (e.g., a movement rate substantially equal to the movement rate of a gesture made by a user's finger or other object on the touchscreen). The UI system calculates a second movement substantially parallel to the first movement based at least in part on the user input, the second movement comprising a movement of visual information in the second layer from an initial second-layer position to a current second-layer position. The second movement is in the first direction at a second movement rate. The second movement rate differs from the first movement rate.

The first layer has a user interface element (e.g., a vertically scrollable element such as a list of links) operable to move in a second direction (e.g., a vertical direction) substantially orthogonal to the first direction (e.g., a horizontal direction). The UI system receives a second user input corresponding to a second gesture on the touchscreen and calculates a substantially orthogonal movement (e.g., a vertical movement) based at least in part on the second user input. The substantially orthogonal movement comprises a movement of visual information in the user interface element in the first layer from an initial element position to a current element position. The current element position can be calculated based on the initial element position and a velocity of the second gesture. A portion of visual information in the user interface element can be outside the display area when the element is in the initial element position and within the display area when the element is in the current element position.

In another aspect, a computing device displays a GUI comprising a content layer, a section header layer, and a title layer. Each layer comprises at least first and second portions of visual information in the respective layer. The first portion of visual information in the respective layer is in a display area, and the second portion of visual information in the respective layer is outside of the display area. The content layer comprises at least one scrollable element having a first portion of visual information in the display area and a second portion of visual information outside of the display area. The computing device receives first user input via a touchscreen and calculates a content-layer movement based at least in part on the first user input. The content-layer movement comprises a movement of the content layer from (a) an initial content-layer position in which the second portion of visual information in the content layer is outside the display area, to (b) a current content-layer position in which the second portion of visual information in the content layer is within the display area. The computing device animates the movement from (a) to (b). The content-layer movement is in a first direction at a content-layer movement rate. The computing device calculates a section-header-layer movement based at least in part on the first user input. The section-header-layer movement comprises a movement of the section header layer from (c) an initial section-header-layer position in which the second portion of visual information in the section header layer is outside the display area, to (d) a current section-header-layer position in which the second portion of visual information in the section header layer is within the display area. The computing device animates the movement from (c) to (d). The section-header-layer movement is in the first direction at a section-header-layer movement rate. The computing device calculates a title-layer movement based at least in part on the first user input. The title-layer movement comprises a movement of the title layer from (e) an initial title-layer position in which the second portion of visual information in the title layer is outside the display area, to (f) a current title-layer position in which the second portion of visual information in the title layer is within the display area. The computing device animates the movement from (e) to (f). The title-layer movement is in the first direction at a title-layer movement rate. The computing device receives second user input via the touchscreen and calculates a scrollable-element movement based at least in part on the second user input. The scrollable-element movement comprises a movement of visual information in the scrollable element from (g) an initial scrollable-element position in which the second portion of visual information in the scrollable element is outside of the display area, to (h) a current scrollable-element position in which the second portion of visual information in the scrollable element is within the display area. The computing device animates the movement from (g) to (h). The scrollable-element movement is in a second direction substantially orthogonal to the first direction. The title-layer movement rate differs from the content-layer movement rate and from the section-header-layer movement rate. The content layer, the section header layer and the title layer are substantially parallel to each other and non-overlapping with respect to each other.

Layers can include lock points. For example, a content layer that includes content panes can have lock points determined (e.g., automatically) based on the number and/or positions of the content panes. Lock points can be set in other ways. For example, lock points can be based on some aspect of a previous state of a layer, such as an exit position of a user interface element in the first layer. Lock points in a second layer (e.g., a background layer, title layer, or section header layer) can have second-layer lock points corresponding to the first layer lock points. Movement rates can be based on distances between lock points. For example, a movement rate can be proportional to a difference between the distance between second-layer lock points and a distance between first-layer lock points (e.g., content-layer lock points) corresponding to the second-layer lock points.

Locking animations can be performed. For example, a locking animation comprises determining whether a threshold number of pixels in a user interface element in a layer are inside the display area and, based on that determination, animating a transition in the layer from a current position to a post-locking-animation position such that the user interface element is visible in the display area. As another example, a locking animation comprises selecting a lock point and animating a transition in a layer from a current position to a post-locking-animation position in which the selected lock point is aligned with a part of the display area. Other transitions can be animated as well, such as a transition in a second layer from a current second-layer position to a second-layer post-locking-animation position that corresponds to the first-layer post-locking-animation position (e.g., a second-layer position in which a second-layer lock point is aligned with a selected first-layer lock point. As another example, a locking animation comprises selecting a first-layer lock point associated with a user interface element (e.g., a content pane) in a first layer (e.g., a content layer), and animating a transition in the first layer from a current first-layer position to a first-layer post-locking-animation position in which the selected first-layer lock point is aligned with a part of the display area and such that the user interface element is visible in the display area. Locking animations can be performed based on user gestures. For example, lock points can be selected based on a velocity of a flick gesture or on a position of a tap gesture.

Locking animations can be adapted to orthogonal movements (e.g., vertical movements) in user interface elements in layers. For example, a vertical locking animation can be performed in a vertically scrollable element (e.g., a list), wherein the vertical locking animation comprises moving the vertically scrollable element such that a lock point in the vertically scrollable element is vertically aligned with a part of the display area.

Wrapping animations can be performed. For example, where two layers each comprise a beginning and an end, and the ends of the layers are displayed in a current position, performing a wrapping animation comprises animating a transition in the first layer from the current first-layer position to a post-wrapping-animation first-layer position in which the beginning of the first layer is displayed, and animating a transition in the second layer from the current second-layer position to a post-wrapping-animation second-layer position in which the beginning of the second layer is displayed. Animating the transitions can comprise moving visual information at a wrapping movement rate that differs from other movement rates.

Movement in the layers (e.g., movement rate, direction, and current position) can be calculated based on user input. For example, a current position can be based on an initial position, and a direction and velocity of a gesture. Movements in layers also can be calculated based on positions of other layers. For example, a current second-layer position can be calculated based on a calculated current first-layer position, such as by calculating the current second-layer position based on a location of a second-layer lock point that corresponds to a first-layer lock point.

Gestures can include, for example, pan, drag, flick, and tap interactions. A flick can be detected by determining whether a rate of movement of a gesture exceeds a threshold. Gestures that indicate direction can cause movement in the indicated direction or in some other direction. For example, a gesture in a horizontal direction can cause movement in a vertical or horizontal direction.

Movement rates can be determined in different ways. For example, a movement rate for a layer can be calculated based on a motion ratio for the layer, where the motion ratio is the width of the layer divided by a maximum width of another layer. As another example, a movement rate can be based on a difference between a length of the first layer and a length of the second layer.

Additional layers can be added. For example, the graphical user interface can include a third layer (or more layers) substantially parallel to the first and second layers. Movement rates in layers can be proportional to differences between lengths the respective layers. In one implementation, a section header layer is above a content layer in the display area, a title layer is above the section header layer in the display area, and the content layer, the section header layer and the title layer overlap a background layer.

The foregoing and other objects, features, and advantages of the invention will become more apparent from the following detailed description, which proceeds with reference to the accompanying figures.

BRIEF DESCRIPTION OF THE DRAWINGS

FIGS. 3A-3C are diagrams showing multiple layers in a graphical user interface presented by a multi-layer UI system, according to one or more described embodiments.

FIG. 4 is a flow chart showing an example technique in which a UI system calculates movements in a first direction in a multi-layer GUI, according to one or more described embodiments.

FIGS. 6A-6D are diagrams showing multiple UI layers where two layers move in tandem, according to one or more described embodiments.

DETAILED DESCRIPTION

Figure 1:
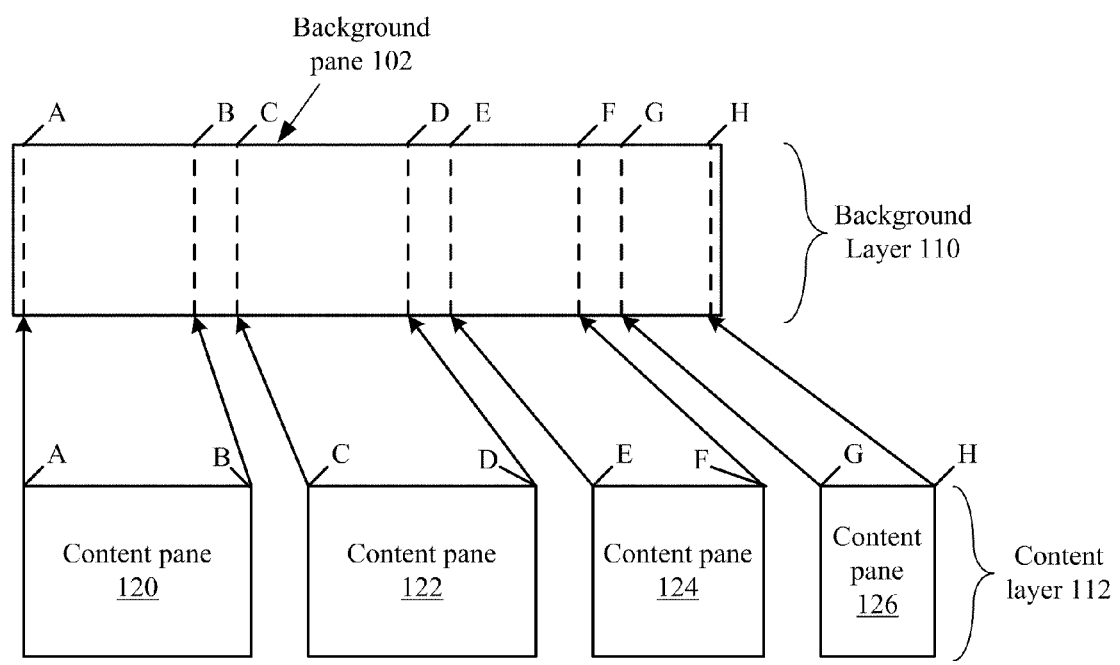
FIG. 1 is a diagram showing a background layer and a content layer with lock points, according to one or more described embodiments.

Techniques and tools are described that relate to different aspects of a user interface in which layers of visual information that relate to one another move at different rates. In one implementation, the layers move in the same direction at rates that are a function of the length of the layer, in response to user input. For example, a graphical user interface (GUI) comprises a background layer, a title layer, and a content layer. A user navigating through the content layer in a particular direction (e.g., from left to right in a horizontal dimension) also causes movement in the same direction in the background layer and/or the title layer. The amount and nature of the movement depends on one or more factors, such as the relative length of the layers, or the relative distance between corresponding lock points. For example, if the content layer is longer (in terms of pixels) than the background layer, the content layer moves faster (on a pixel basis) than the background layer.

Various alternatives to the implementations described herein are possible. For example, techniques described with reference to flowchart diagrams can be altered by changing the ordering of stages shown in the flowcharts, by repeating or omitting certain stages, etc. As another example, systems described with reference to system diagrams can be altered by changing the ordering of processing stages shown in the diagrams, by repeating or omitting certain stages, etc. As another example, user interfaces described with reference to diagrams can be altered by changing the content or arrangement of user interface features shown in the diagrams, by omitting certain features, etc. As another example, although some implementations are described with reference to specific devices and user input mechanisms (e.g., mobile devices with a touchscreen interface), described techniques and tools can be used with other devices and/or user input mechanisms.

The various techniques and tools can be used in combination or independently. Different embodiments implement one or more of the described techniques and tools.

I. Layered Graphical User Interface Techniques and Tools

The design of effective user interfaces poses many challenges. One challenge is how to provide a user with an optimal amount of visual information or functionality, given the space limitations of displays. This challenge can be especially acute for devices with small displays, such as smartphones or other mobile computing devices. This is because there is often more information or functionality available than can fit on the display.

By putting layers of data on top of each other and allowing them to move in different ways, a graphical user interface can provide a context for information that a user is viewing, even if there is more information relevant to the user's current activity that is not visible on the display. For example, a content layer can move independently to at least some extent, allowing a user to move different parts of the content layer into view and out of view, while some portion of another layer associated with the content layer remains visible, even if that other layer moves to a lesser extent than the content layer.

Described techniques and tools relate to separating information (e.g., visual information, functional information and metadata) in a user interface (UI), such as a graphical user interface (GUI), into layers (e.g., parallel layers or layers that are at least substantially parallel), and moving such layers in different ways (e.g., at different speeds). For example, described embodiments involve a multi-layer. UI system that presents UI layers that move at different speeds relative to one another. The rate of movement in each layer can depend on several factors, including the amount of data to be presented visually (e.g., text or graphics) in the layer, or the relative distance between corresponding lock points, which are described in more detail below. The amount of data to be presented visually in a layer can measured by, for example, determining the length as measured in a horizontal direction of the data as rendered on a display or as laid out for possible rendering on the display. Length can be measured in pixels or by some other suitable measure (e.g., the number of characters in a string of text). A layer with a larger amount of data and moving at a faster rate can advance by a number of pixels that is greater than a layer with a smaller amount of data moving at a slower rate. Layer movement rates can be determined in different ways. For example, movement rates in slower layers can be derived from movement rates in faster layers, or vice versa. Or, layer movement rates can be determined independently of one another.

The movement in various layers of the UI typically depends to some extent on user interaction. For example, a user that wishes to navigate from one part of a layer to another provides user input to indicate a desired direction of movement. The user input can then cause movement in one or more layers on a display. In some embodiments, a user causes movement of a layer visible in a display area of a device by interacting with a touchscreen. The interaction can include, for example, contacting the touchscreen with a fingertip, stylus or other object and moving it (e.g., with a flicking or sweeping motion) across the surface of the touchscreen to cause a layer to move in a desired direction. Alternatively, a user can interact with a layer in some other way, such as by pressing buttons (e.g., directional buttons) on a keypad or keyboard, moving a trackball, pointing and clicking with a mouse, making a voice command, etc.

When user interaction causes movement in layers, the movement of the layers is a typically a function of the length of the layers and the size, movement rate and direction of the motion made by the user. For example, a leftward flicking motion on a touchscreen produces a leftward movement of the layers relative to the display area. The layers also can be arranged relative to one another such that the layers can move at different rates while providing a user with visual context. For example, a section header (e.g., a text string such as "History") can span visible and off-screen content (e.g., an image representing a currently-playing media file and a list of recently-played media) in a content layer, moving at a different rate than the content layer but providing context for the content.

Depending on implementation and/or user preferences, user input can be interpreted in different ways to produce different kinds of movement in the layers. For example, a multi-layer UI system can interpret any movement to the left or right, even diagonal movements extending well above or below the horizontal plane, as a valid leftward or rightward motion of a layer, or the system can require more precise movements. As another example, a multi-layer UI system can require that a user interact with a part of a touchscreen corresponding to the display area occupied by a layer before moving that layer, or the system can allow interaction with other parts of the touchscreen to cause movement in a layer. As another example, a user can use an upward or downward motion to scroll up or down in a part of the content layer that does not appear on the display all at once, such as a list of elements, and such upward/downward motion can even be combined with left/right motion for diagonal movement effects.

The actual amount and direction of the user's motion that is necessary to produce particular movements in the layers can vary depending on implementation or user preferences. For example, a multi-layer UI system can include a default setting that is used to calculate the amount of motion in a layer (e.g., in terms of pixels) as a function of the size or movement rate (or velocity) of a user movement. As another example, a user can adjust a touchscreen sensitivity control, such that the same motion of a fingertip or stylus on a touchscreen will produce smaller or larger movements of the layers, depending on the setting of the control.

In some embodiments, layers include lock points. Lock points in layers indicate corresponding positions with which a display area of a device will be aligned. For example, when a user navigates to a position on a content layer such that the left edge of the display area is at a left-edge lock point "A," the left edge of display area will also be aligned at a corresponding left-edge lock point "A" in each of the other layers. Lock points also can indicate alignment of a right edge of a display area (right-edge lock points), or other types of alignment (e.g., center lock points). Typically, corresponding lock points in each layer are positioned to account for the fact that layers will move at different speeds. For example, if the distance between a first lock point and a second lock point in a content layer is twice as great as the distance between corresponding first and second lock points in a background layer, the background layer moves at half the rate of the content layer when transitioning between the two lock points.

In the example shown in FIG. 1, a background layer 110 and a content layer 112 have corresponding left-edge lock points "A," "C," "E," and "G," and corresponding right-edge lock points "B," "D," "F," and "H." The left-edge lock points align with the left edge of a display area (not shown), and right-edge lock points align with the right edge of the display area. Left-edge or right-edge alignment corresponding to lock points can involve precise alignment of lock points with the edge of a display area, or can involve some amount of padding between the lock point and the edge of the display area. In the content layer 112, the left-edge lock points align on the left edge of a content pane (e.g., content panes 120, 122, 124 and 126, respectively), and the right-edge lock points align on the right edge of a content pane. The mapping between the lock points in the two layers 110, 112 is indicated by arrows between the two layers and dashed lines in background pane 102.

The lock points shown in FIG. 1 are not generally representative of a complete set of lock points. As an alternative, lock points can indicate other kinds of alignment. For example, center lock points can indicate alignment with the center of a display area. As another alternative, fewer lock points can be used, or more lock points could be used so as to provide overlap between displayable areas. For example, lock points can be limited to either left-edge or right-edge lock points, or lock points can be used for some parts of a layer, but not others. As another alternative, lock points can be omitted.

In addition to indicating corresponding positions in layers, lock points can exhibit other behavior. For example, lock points can indicate positions in a content layer to which the layer will move when the part of the layer corresponding to the lock point comes into view on the display. This can be useful, for example, when an image, list or other content element comes partially into view near the left or right edge of the display area—the content layer can automatically bring the content element completely into view by moving the layer such that an edge of the display area aligns with an appropriate lock point. A lock animation can be performed at the end of a navigation event, such as a flick or pan gesture, to align the layers with a particular lock point. In the event that a navigation event produces a user-generated movement that does not align precisely with a lock point, a lock animation can be used to align the layers. As an example, a lock animation can be performed at the end of a navigation event that causes movement of a content layer to a position between two content panes (e.g., where portions of two content panes are visible in a display area). A multi-layer UI system can check which content pane occupies more space in the display area and transition to that pane using the lock animations. This can improve the overall look of the layers and can be effective in bringing information or functionality (e.g., functional UI elements) into view in a display area.

Lock points also can be useful to provide a locking "notch" or "bump" effect during navigation. For example, as a user navigates along the length of a content layer, the layer can stop at lock points (e.g., at regularly spaced intervals, between content elements, etc.) after each navigation movement (e.g., a flick or pan motion on a touchscreen) made by the user.

Movement of various layers can differ depending on context. For example, a user can navigate left from the beginning of a content layer to reach the end of a content layer, and can navigate right from the end of the content layer to reach the beginning of a content layer. This wrapping feature provides more flexibility when navigating through the content layer. Wrapping can be handled by the multi-layer UI system in different ways. For example, wrapping can be handled by producing an animation that shows a rapid transition from the end of layers such as title layers or background layers back to the beginning of such layers, or vice-versa. Such animations can be combined with ordinary panning movements in the content layer, or with other animations in the content layer, such as locking animations. However, wrapping functionality is not required.

Example 1

Multiple UI Layers

Figure 2:
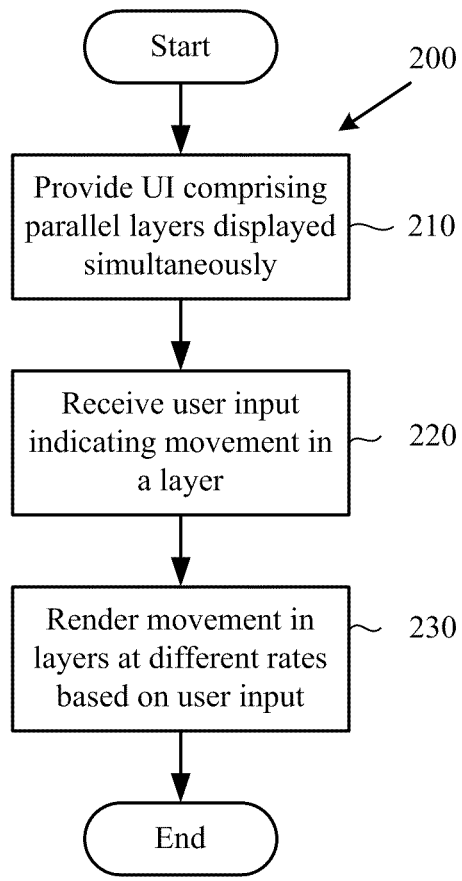
FIG. 2 is a flow chart showing an example technique for providing a user interface with multiple layers moving at different rates, according to one or more described embodiments.

FIG. 2 is a flow chart showing an example technique 200 for providing a user interface with multiple layers moving at different rates. At 210, a multi-layer UI system provides a user interface comprising parallel layers displayed simultaneously (e.g., in a display area of a computing device). Typically, at least part of at least one of the layers is not visible in the display area. At 220, the system receives user input that indicates movement to be made in a layer. For example, where a content layer extends beyond the right edge of a display area, a user can interact with a touchscreen to cause a panning motion in the content layer, in order to view a different portion of the content layer. At 230, the system renders movement in the parallel layers at different movement rates, depending at least in part on the user input. For example, the system can cause a content layer to move at a rate equal to the rate of a panning gesture on a touchscreen, and cause a title layer and a background layer to move at a slower rate.

Figure 3B:
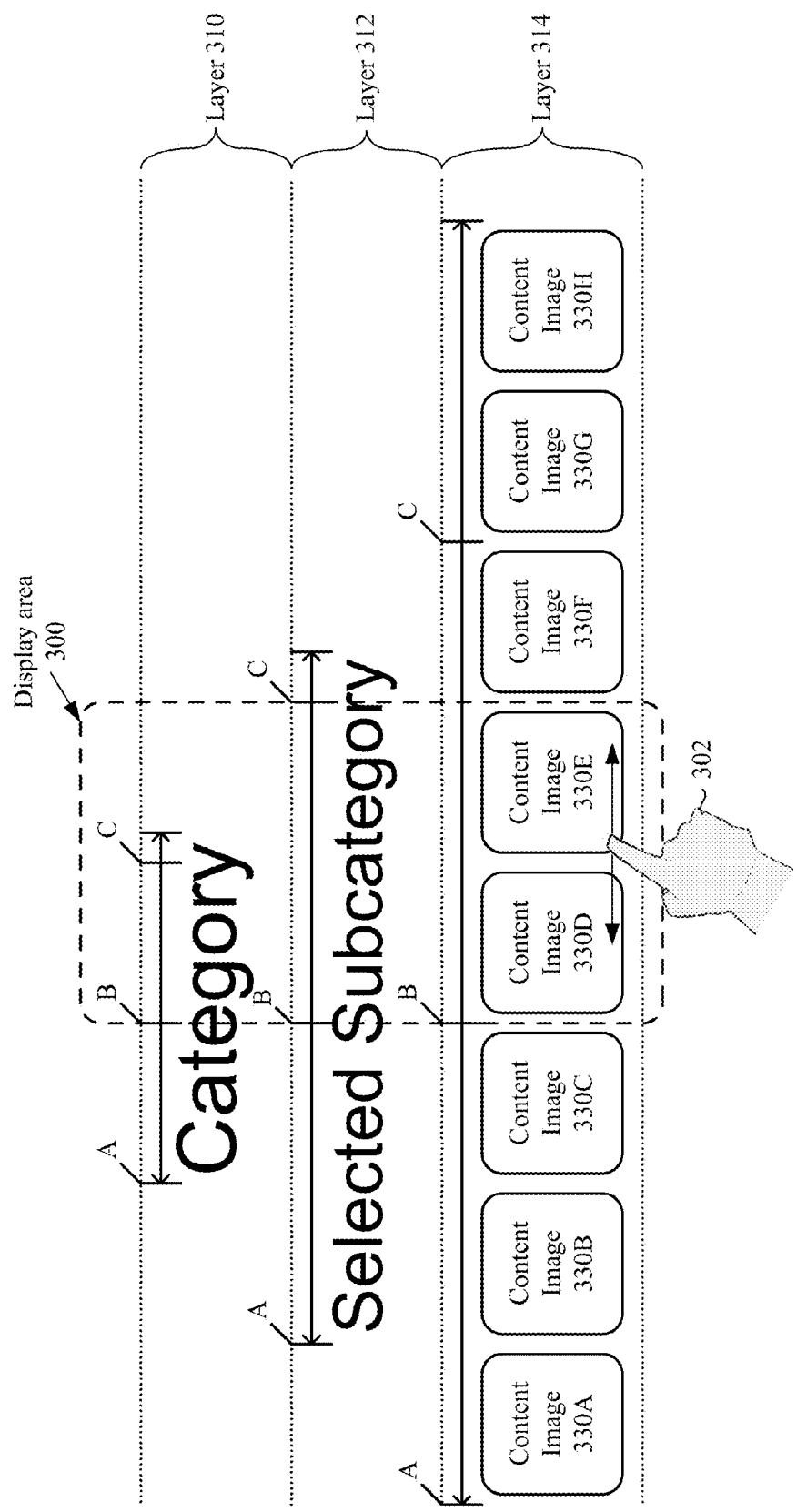
Figure 3C:
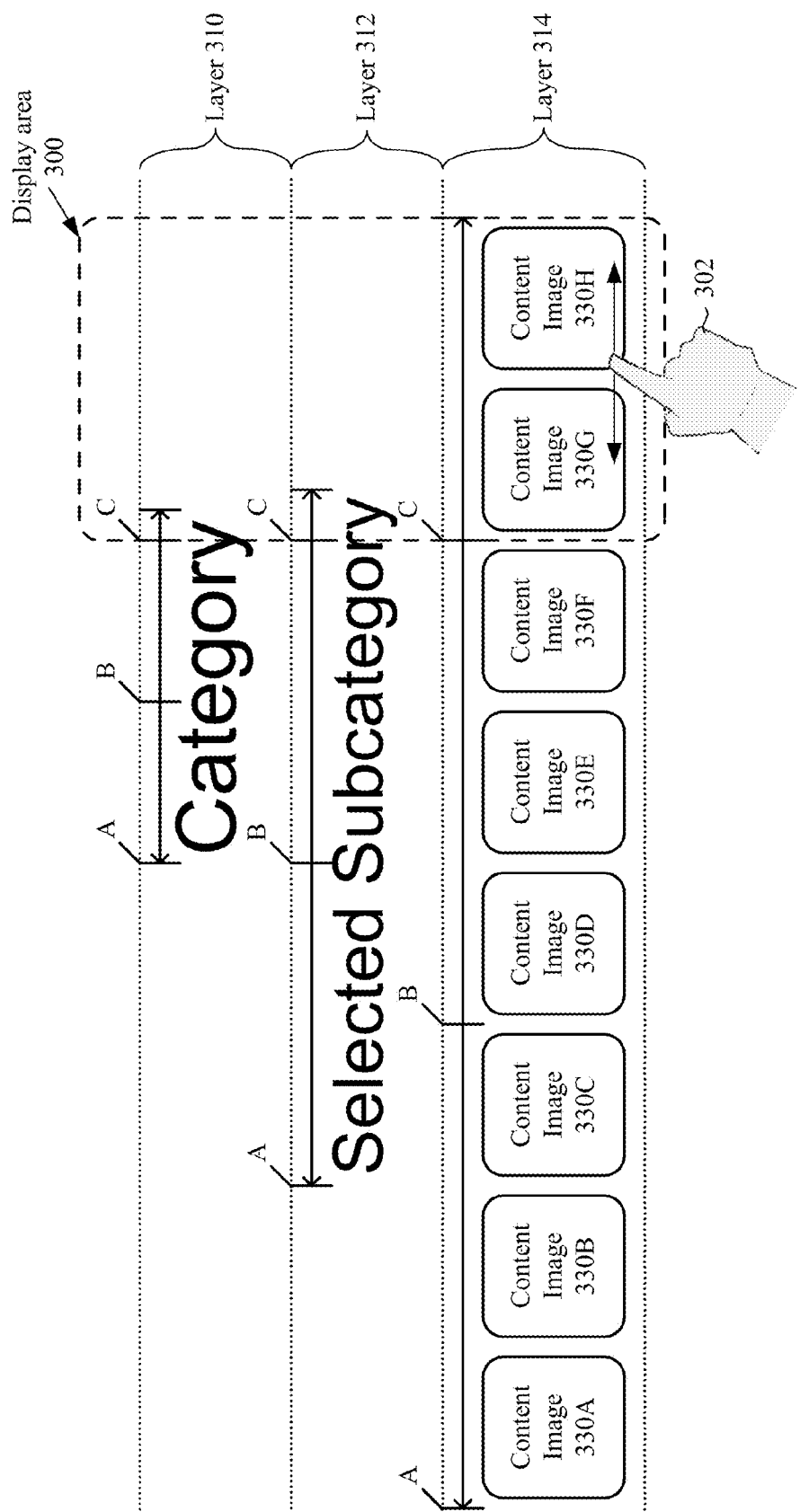

FIGS. 3A-3C are diagrams showing multiple layers 310, 312, 314 in a GUI presented by a multi-layer UI system for a device having a display with a display area 300. The display area 300 has dimensions typical of displays on smartphones or similar mobile computing devices. According to the example shown in FIGS. 3A-3C, a user 302 (represented by the hand icon) interacts with content layer 314 by interacting with a touchscreen having the display area 300. The interaction can include, for example, contacting the touchscreen with a fingertip, stylus or other object and moving it (e.g., with a flicking or sweeping motion) across the surface of the touchscreen.

The content layer 314 includes content elements (e.g., content images 330A-H). Layers 310, 312 include text information ("Category" and "Selected Subcategory," respectively). The length of content layer 314 is indicated to be approximately twice the length of layer 312, which is in turn indicated to be approximately twice the length of layer 310.

In FIGS. 3A-3C, the direction of motion of the layers that can be caused by the user 302 is indicated by a left-pointing arrow and a right-pointing arrow. These arrows indicate possible movements (e.g., left or right horizontal movements) of the layers 310, 312, 314 in response to user input.

In the example shown in FIG. 3A-3C, the system interprets user movements to the left or right, even diagonal movements extending above or below the horizontal plane, as input that indicates a valid leftward or rightward motion of a layer. Although the example shown in FIGS. 3A-3C shows the user 302 interacting with a portion of the display area 300 that corresponds to the content layer 314, the system does not require a user to interact with a part of a touchscreen corresponding to the display area occupied by the content layer 314. Instead, the system allows interaction with other parts of the touchscreen (e.g., parts that correspond to portions of display area 300 occupied by other layers) to cause movement in the layers 310, 312, 314.

When the user input indicates a motion to the right or left, the system produces a rightward or leftward movement of the layers 310, 312, 314 relative to the display area 300. The amount of movement of the layers 310, 312, 314 is a function of the data in the layers and the size or movement rate (or velocity) of the motion made by the user.

In the example shown in FIGS. 3A-3C, the layers 310, 312, 314 move according to the following rules, except during wrapping animations:

1. The content layer 314 will move at approximately twice the rate of the layer 312, which is approximately half the length of layer 314.
2. The layer 312 will move at approximately twice the rate of the layer 310, which is approximately half the length of layer 312.
3. The content layer 314 will move at approximately four times the rate of the layer 310, which is approximately ¼ the length of layer 314.

Movement in the layers 310, 312, 314 may differ from the rules described above in some circumstances. In the example shown in FIGS. 3A-3C, wrapping is permitted. The arrows indicate that a user can navigate left from the beginning of the content layer 314 (the position shown in FIG. 3A), and can navigate right from the end of the content layer 314 (the position shown in FIG. 3C). During a wrapping animation, some layers may move faster or slower than during other kinds of movements. In the example shown in FIGS. 3A-3C, the text in layers 310 and 312 moves faster when wrapping back to the beginning of the content layer. In FIG. 3C, display area 300 shows portions of one and two letters, respectively, in layers 310 and 312, at the end of the respective text strings. A wrapping animation to return to the state shown in FIG. 3A can include bringing the text of the layers 310, 312 into view from the right, resulting in a more rapid movement than in other contexts, such as the transition from the state shown FIG. 3A to the state shown in FIG. 3B.

In FIGS. 3A-3C, example left-edge "lock points" "A," "B" and "C" are indicated for each layer. The left-edge lock points indicate the corresponding position of the left edge of the display area 300 on each layer. For example, when a user navigates to a position on content layer 314 such that the left edge of the display area 300 is at lock point "A," the left edge of display area will also be aligned at lock point "A" of the other layers 310, 312, as shown in FIG. 3A. In FIG. 3B, the left edge of the display area 300 is at lock point "B" in each of the layers 310, 312, 314. In FIG. 3C, the left edge of the display area 300 is at lock point "C" in each of the layers.

The lock points shown in FIGS. 3A-3C are not generally representative of a complete set of lock points, and are limited to lock points "A," "B" and "C" only for brevity. For example, left-edge lock points can be set for each of the content images 330A-330H. Alternatively, fewer lock points can be used, or lock points can be omitted. As another alternative, lock points can indicate other kinds of alignment. For example, right-edge lock points can indicate alignment with the right edge of display area 300, or center lock points can indicate alignment with the center of display area 300.

Example 2

Changes in Display Orientation

Described techniques and tools can be used on display screens in different orientations, such as landscape orientation. Changes in display orientation can occur, for example, where a UI has been configured (e.g., by user preference) to be oriented in landscape fashion, or where a user has physically rotated a device. One or more sensors (e.g., an accelerometer) in the device can be used to detect when a device has been rotated, and adjust the display orientation accordingly.

Figure 3D:
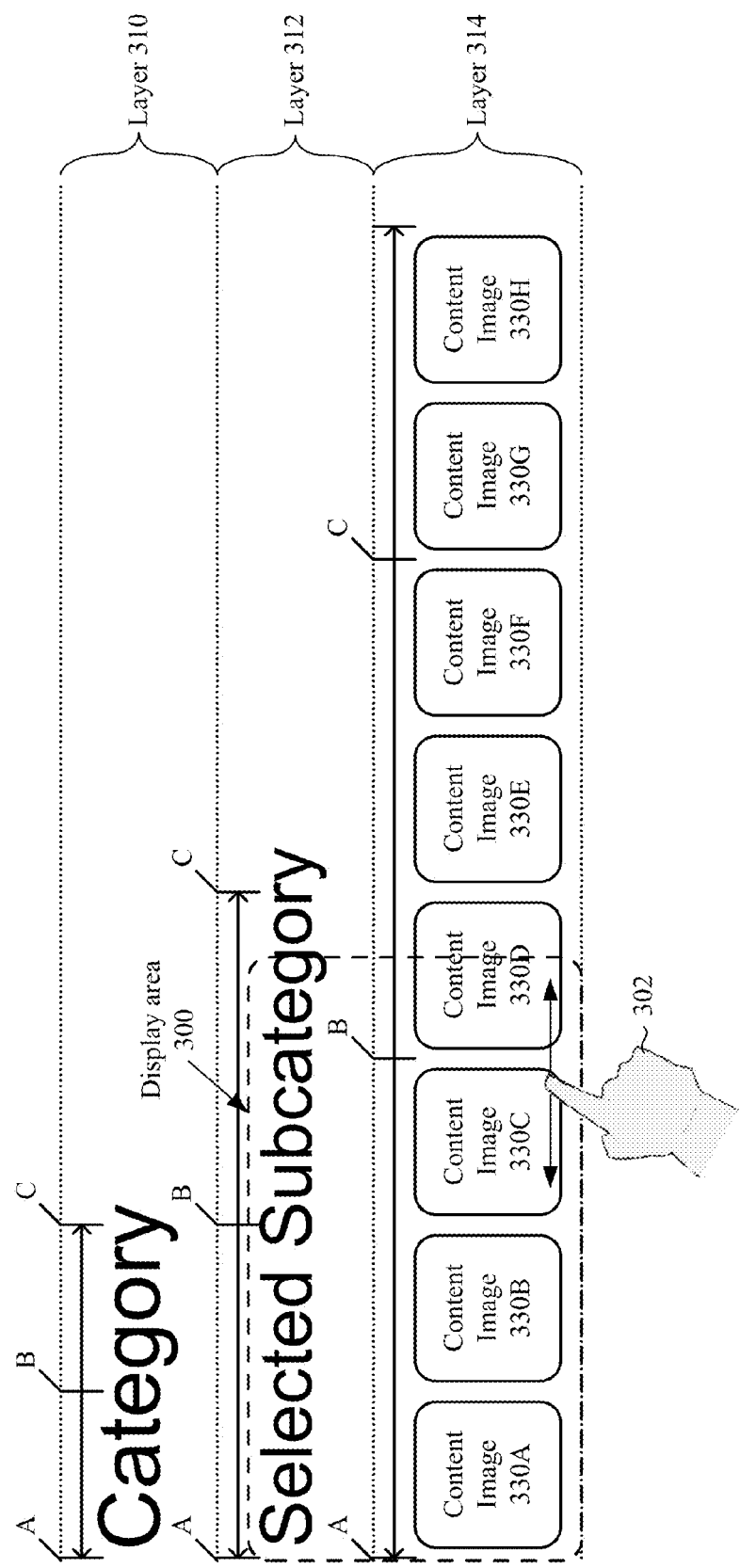
FIG. 3D is a diagram showing the multiple layers of FIGS. 3A-3C, where the display area is oriented in landscape fashion, according to one or more described embodiments.

In the example shown in FIG. 3D, the display area is oriented in landscape fashion, and only layers 312 and 314 are visible. However, more of the content layer is visible, allowing the user to see more content in the content layer (e.g., content images 330A-330D) at one time. Alternatively, adjustments can be made to keep all layers visible, such as by reducing the height of layers and reducing font and image sizes, as appropriate. For example, the height of layers 310 and 312 can be reduced, along with a corresponding reduction in the size of the font in the text, so that the layers 310 and 312 are still visible, while keeping the content layer 314 the same size for ease of navigation.

As in FIGS. 3A-3C, a user 302 can make leftward or rightward (in landscape orientation) motions to navigate along the content layer 314. The positioning of lock points "A," "B" and "C" in each layer, and the relative length of the layers, shows that the content layer 314 will move at approximately twice the rate of the layer 312 above it. Alternatively, positions of lock points and distances between lock points can be dynamically adjusted to take into account effects of the reorientation (e.g., a new effective width of the display area). However, such adjustments are not required. For example, if a display area has equal height and width, reorientation of the display area to a landscape orientation will not change the effective width of the display area.

Example 3

Calculating Movements in Multiple UI Layers

FIG. 4 is a flow chart showing an example technique 400 in which a UI system calculates movements in a first direction (e.g., a horizontal direction) in a multi-layer GUI (e.g., the GUI shown in FIGS. 3A-3C).

At 410, the UI system displays a graphical user interface comprising plural layers. A first portion of visual information (e.g., content image 330 as shown in FIG. 3A) in a first layer (e.g., content layer 314) is within a display area (e.g., display area 300) of a touchscreen. At 420, the UI system receives user input corresponding to a gesture on the touchscreen. At 430, the UI system calculates a first movement based at least in part on the user input. The first movement is a movement of the first layer from an initial first-layer position (e.g., the position shown in FIG. 3A) in which a second portion of visual information (e.g., content image 330C) in the first layer is outside the display area to a current first-layer position (e.g., the position shown in FIG. 3B) in which the second portion of visual information in the first layer is within the display area. The first movement is in a first direction (e.g., a rightward, horizontal direction) at a first movement rate. The first movement rate is based on a movement rate of the gesture. For example, the first movement rate can be substantially equal to the gesture movement rate (e.g., the movement rate of a user's finger or other object on the touchscreen), to give the user a sense of directly manipulating content on the touchscreen. At 440, the UI system calculates a second movement substantially parallel to the first movement based at least in part on the user input. The second movement is a movement of visual information in a second layer (e.g., layer 312) from an initial second-layer position (e.g., the position shown in FIG. 3A) to a current second-layer position (e.g., the position shown in FIG. 3B). The second movement is in the first direction (e.g., the rightward, horizontal direction) at a second movement rate that differs from the first movement rate.

The movements can be animated and/or rendered for display (e.g., on a touchscreen of a mobile phone or other computing device).

Example 4

Individual Layers Moving at Varying Speeds

FIGS. 5A-5D are diagrams showing a GUI presented by a multi-layer UI system with three layers 510, 512, 514, in which different parts of a section header layer 512 are associated with different parts of a content layer 514. According to the example shown in FIGS. 5A-5D, a user (not shown) interacts with content layer 514. For example, the user navigates the content layer 514 by pressing navigational buttons (not shown) to highlight different sections (e.g., Section 1a, 1b, 1c, 1d, 2a, 2b, 2c, or 2d) in the content layer. Alternatively, the user interacts with content layer 514 by interacting with a touchscreen having the display area 300. The interaction can include, for example, contacting the touchscreen with a fingertip, stylus or other object and moving it (e.g., with a flicking or sweeping motion) across the surface of the touchscreen.

The content layer 514 includes Sections 1a, 1b, 1c, 1d, 2a, 2b, 2c, and 2d, which can be images, icons, lists of text strings or links, or some other content. The other layers 510, 512 include text information. Section header layer 512 includes two text strings ("Feature 1" and "Feature 2"). "Feature 1" is associated with Sections 1a, 1b, 1c and 1d. "Feature 2" is associated with Sections 2a, 2b, 2c and 2d. Layer 510 includes one text string ("Application"). The length of content layer 514 is indicated to be longer than the total length of section header layer 512 (e.g., the combined length of the two strings), and longer than the length of layer 510.

In FIGS. 5A-5D, the direction of motion that can be indicated by the user is indicated by a left- and right-pointing arrow above display area 300. These arrows indicate possible movements (left or right horizontal movements) of the layers 510, 512, 514 in response to user input.

In the example shown in FIG. 5A-5D, the user highlights different sections of the content layer 514 (e.g., Section 1a in FIG. 5A, Section 1d in FIG. 5B, Section 2a in FIG. 5C, and Section 2d in FIG. 5D) when navigating left or right in the content layer 514. When the user input indicates a motion to the right or left, the system produces a rightward or leftward movement of the layers 510, 512, 514 relative to the display area 300. The amount of movement of the layers 510, 512, 514 is a function of the data in the layers and the size or movement rate (or velocity) of the motion made by the user.

Figure 5A:
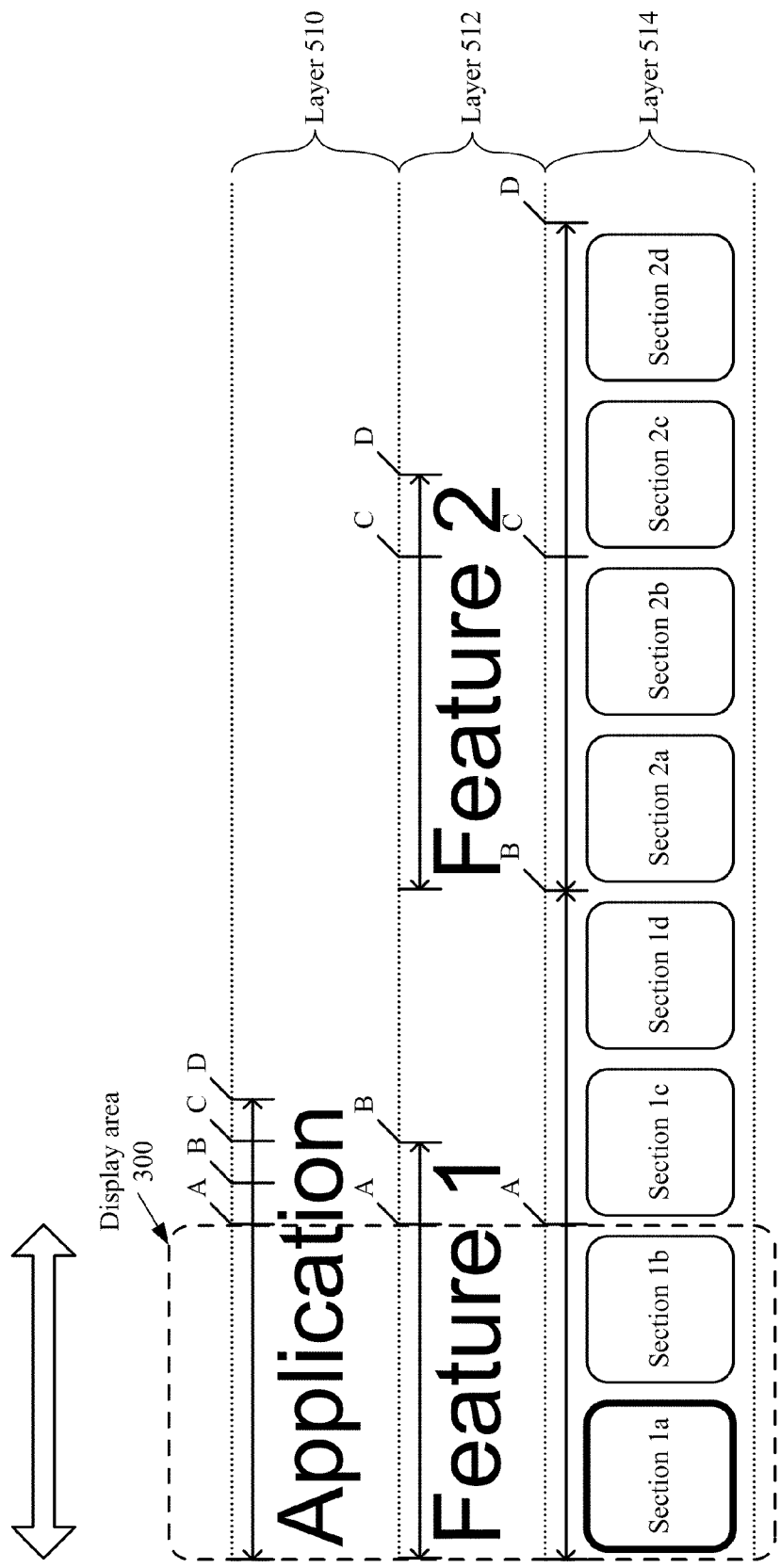
FIGS. 5A-5D are diagrams showing multiple UI layers, with a layer with different parts capable of moving at different rates, according to one or more described embodiments.
Figure 5B:
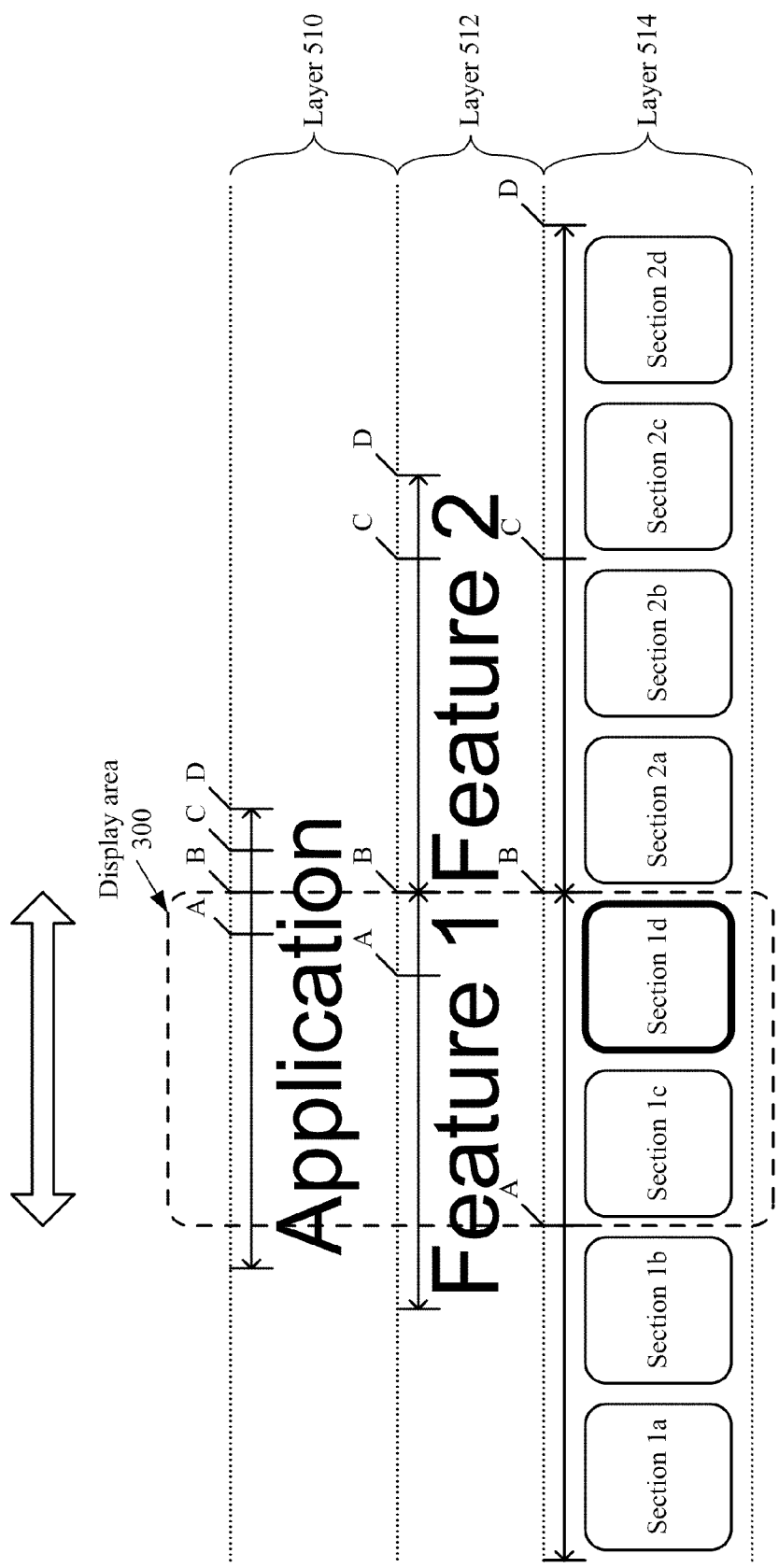
Figure 5C:
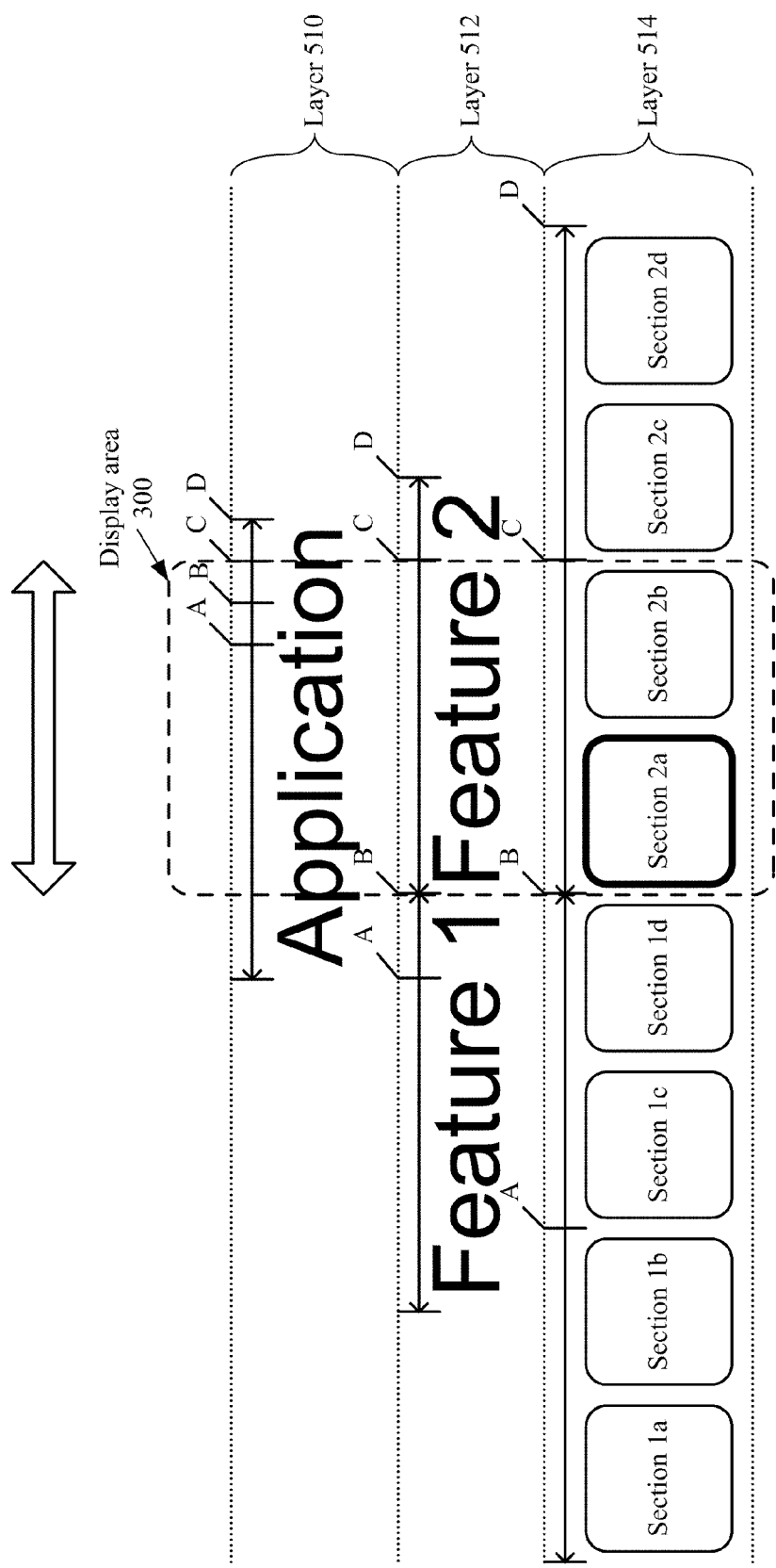
Figure 5D:
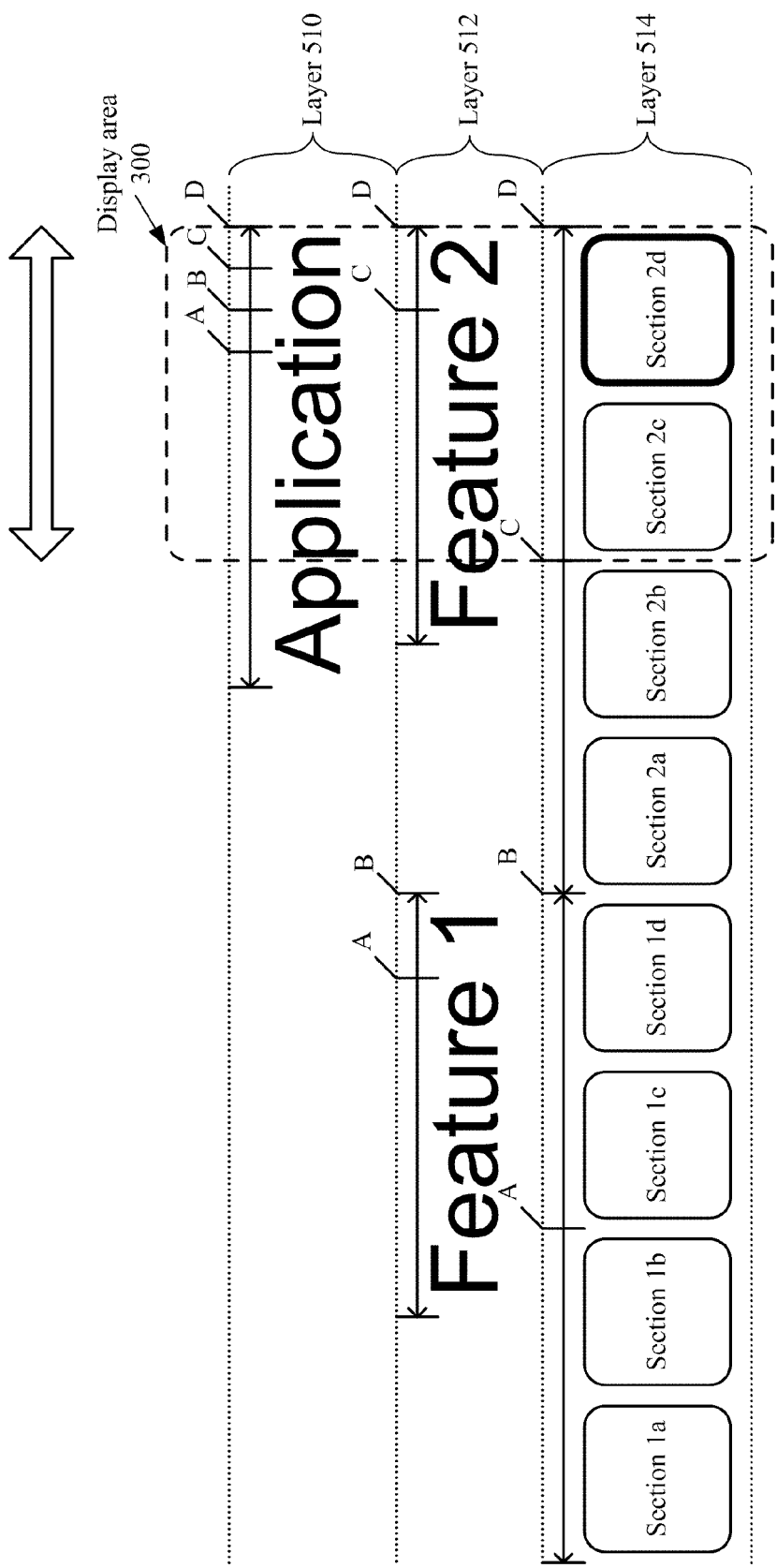

In FIGS. 5A-5D, example right-edge lock points "A," "B," "C" and "D" are indicated for each layer 510, 512, 514. The right-edge lock points for each layer indicate the corresponding position of the right edge of the display area 300 on each layer. For example, when a user navigates to Section 1a on content layer 514, the right edge of the display area 300 is at lock point "A," and the right edge of the display area 300 will also be aligned at lock point "A" of the other layers 510, 512, as shown in FIG. 5A. In FIG. 5B, the right edge of the display area 300 is at lock point "B" in each of the layers 510, 512, 514. In FIG. 5C, the right edge of the display area 300 is at lock point "C" in each of the layers 510, 512, 514. In FIG. 5D, the right edge of the display area 300 is at lock point "D" in each of the layers 510, 512, 514.

The lock points shown in FIGS. 5A-5D are not generally representative of a complete set of lock points, and are limited to lock points "A," "B," "C" and "D" only for brevity. For example, left-edge lock points can be set for one or more sections in the content layer 514. Alternatively, additional right-edge lock points can be used, fewer lock points can be used, or lock points can be omitted. As another alternative, lock points can indicate other kinds of alignment. For example, or center lock points can be used to obtain alignment with the center of display area 300.

In the example shown in FIGS. 5A-5D, the layers 510, 512, 514 move according to the following rules, except during wrapping animations:

1. The portion of content layer 514 associated with the "Feature 1" text string in section header layer 512 (Sections 1a, 1b, 1c and 1d) will move at approximately four times the rate of the "Feature 1" text string. Although the "Feature 1" text string is approximately half the length of the portion of content layer 514 (Sections 1a, 1b, 1c and 1d) associated with the "Feature 1" text string, the distance to be moved from right-edge lock point "A" to right-edge lock point "B" in content layer 514 is approximately four times longer than the distance between the corresponding lock points in section header layer 512. Similarly, the portion of content layer 514 associated with the "Feature 2" text string in section header layer 512 (Sections 2a, 2b, 2c and 2d) will move at approximately four times the rate of the "Feature 2" text string.

2. When navigating through the portion of content layer 514 associated with the "Feature 1" text string in section header layer 512 (Sections 1a, 1b, 1c and 1d), the "Feature 1" text string will move at approximately twice the rate of layer 510. Although the "Feature 1" text string is nearly as long as the "Application" text string in layer 510, the distance to be moved from right-edge lock point "A" to right-edge lock point "B" in layer 510 is approximately half as long as the distance between the corresponding lock points in section header layer 512. Similarly, when navigating through the portion of content layer 514 associated with the "Feature 2" text string in section header layer 512 (Sections 2a, 2b, 2c and 2d), the "Feature 2" text string will move at approximately twice the rate of layer 510.

3. When navigating from the portion of content layer 514 associated with the "Feature 1" text string in section header layer 512 to the portion of content layer 514 associated with the "Feature 2" text string in section header layer 512 (i.e., from Section 1d as shown in FIG. 5B to Section 2a as shown in FIG. 5C), section header layer 512 moves more rapidly, as shown by the distance between right-edge lock point "B" and right-edge lock point "C" in layer 512 in FIG. 5C.

4. Content layer 514 will move at approximately eight times the rate of layer 310. The distance to be moved between neighboring right-edge lock points (e.g., from "A" to "B") in content layer 514 is approximately eight times longer than the distance between the corresponding right-edge lock points in layer 510.

Movement in layers 510, 512, 514 may differ from the rules described above in some circumstances. In the example shown in FIGS. 5A-5D, wrapping is permitted. The arrows above display area 300 indicate that a user can navigate left from the beginning of the content layer 514 (the position shown in FIG. 5A), and can navigate right from the end of the content layer 514 (the position shown in FIG. 5D). During a wrapping animation, some layers may move faster or slower than during other kinds of movements. For example, a wrapping animation to return to the state shown in FIG. 5A from the state shown in FIG. 5D can include bringing the text of layers 510, 512 into view from the right, resulting in a more rapid movement than in other contexts, such as the transition from the state shown FIG. 5A to the state shown in FIG. 5B.

Example 5

Layers Moving in Tandem

FIGS. 6A-6D are diagrams showing a GUI presented by a multi-layer UI system that includes a content layer 614 that moves in tandem (i.e., in the same direction and at the same rate) with layer 612 above it. In this example, a user 302 (represented by the hand icon) navigates through content layer 614 by interacting with a touchscreen having the display area 300. The interaction can include, for example, contacting the touchscreen with a fingertip, stylus or other object and moving it (e.g., with a flicking or sweeping motion) across the surface of the touchscreen.

The content layer 614 includes game images 640, 642, 644, lists 650, 652, 654, and avatar 630 (which is described in more detail below). The other layers 610, 612 include text information ("Games" in layer 610; "Spotlight," "Xbox Live," "Requests" and "Collection" in layer 612). In FIGS. 6A-6D, example lock points "A," "B," "C" and "D" are indicated for layers 610 and 612. In terms of horizontal motion, content layer 614 is locked to layer 612; the lock points indicated for layer 612 also apply to layer 614.

Figure 6A:
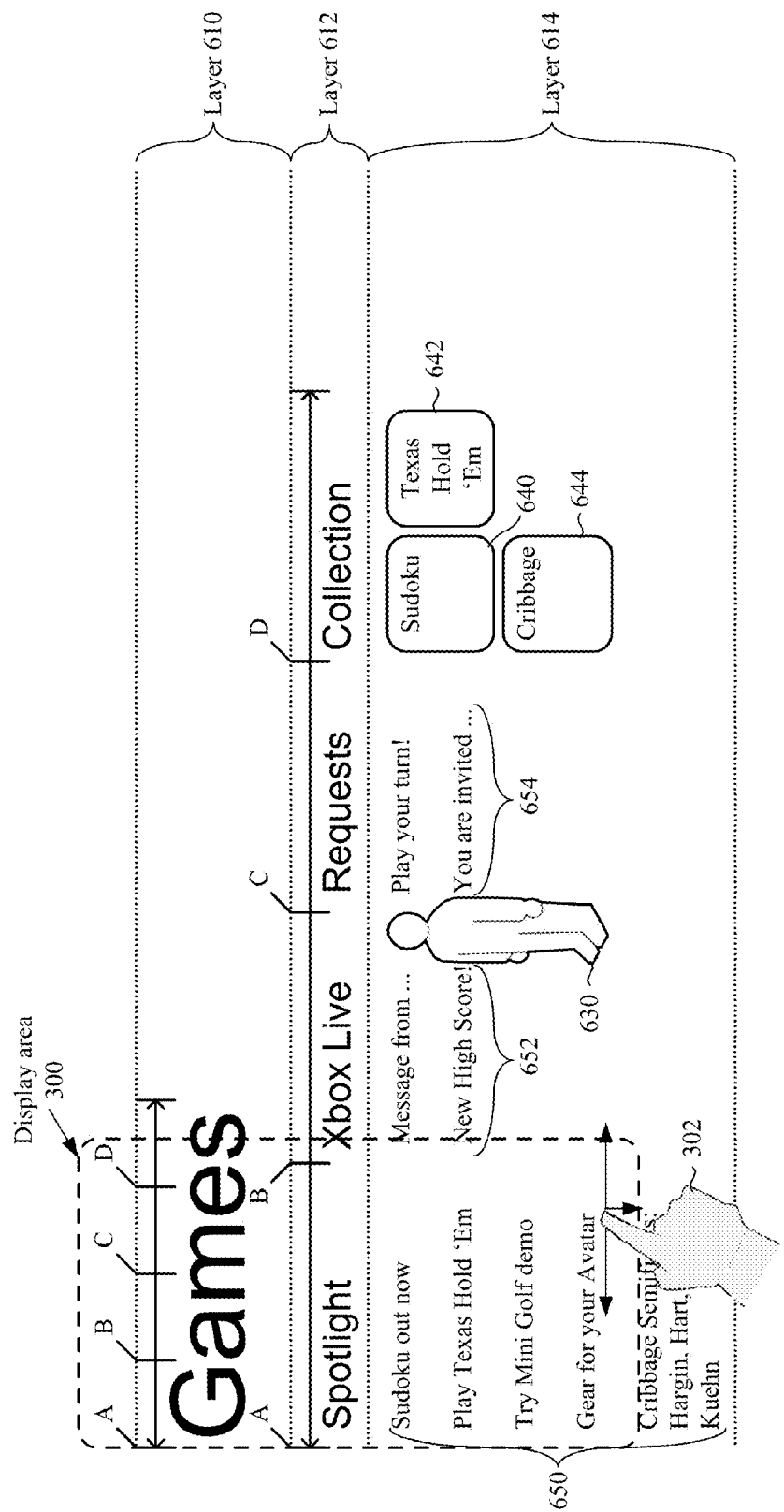
Figure 6B:
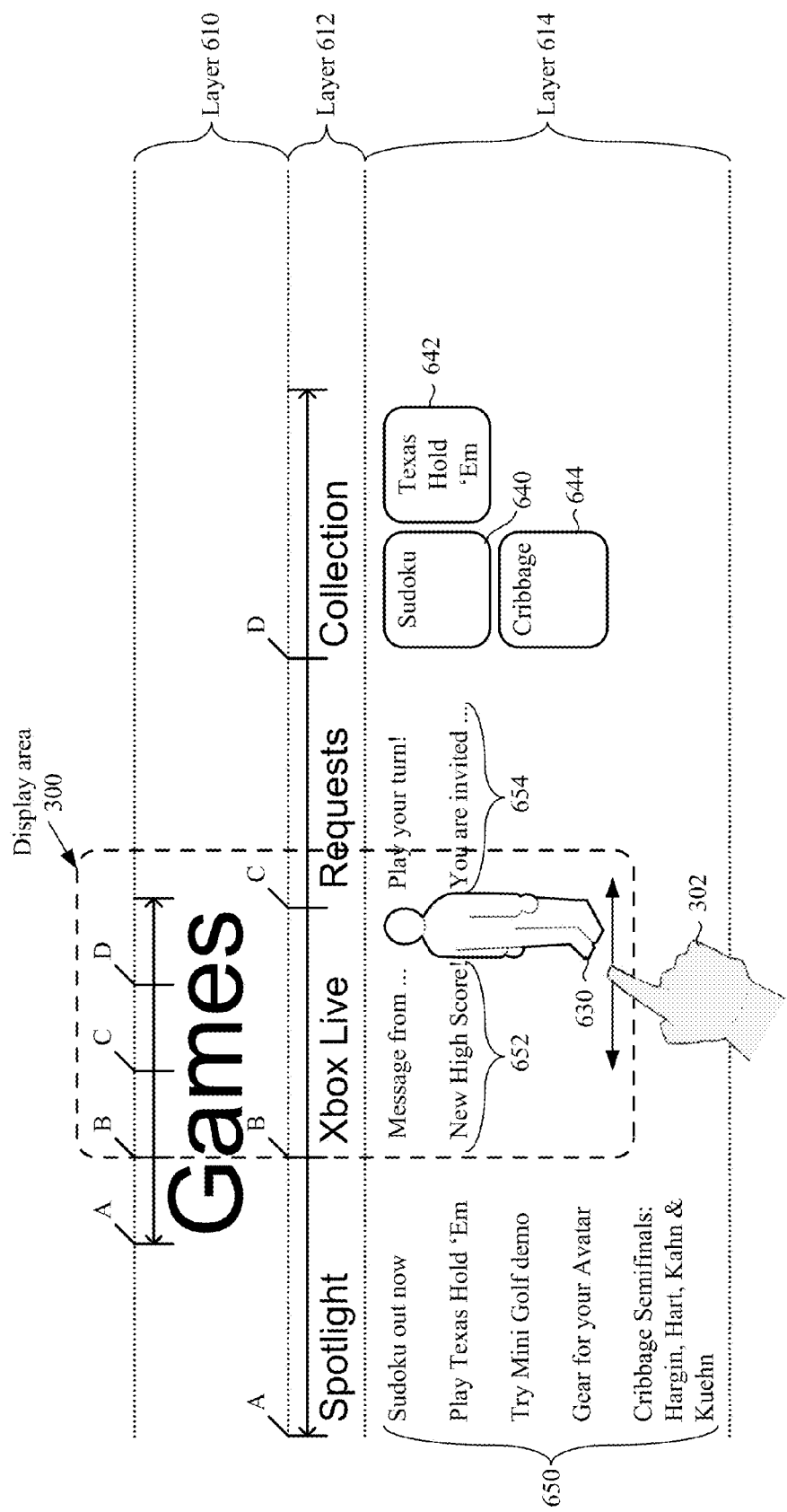
Figure 6D:
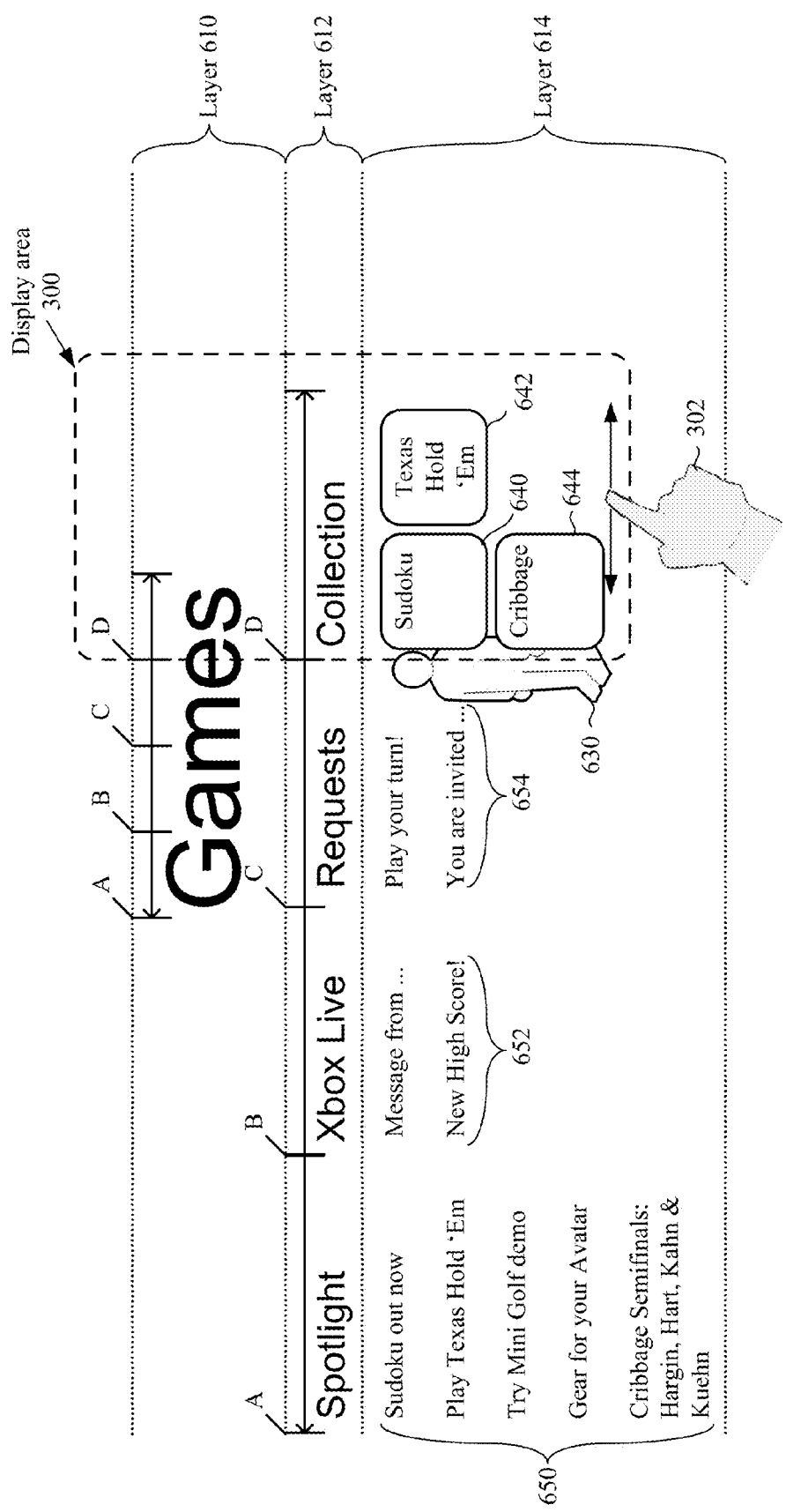

The lock points for each layer indicate the corresponding position of the left edge of the display area 300 on each layer. For example, when a user navigates to a position on content layer 614 such that the left edge of the display area 300 is at lock point "A," the left edge of display area 300 also is aligned at lock point "A" of the other layers 610, 612, as shown in FIG. 6A. In FIG. 6B, the left edge of the display area 300 is at lock point "B" in each of the layers 610, 612, 614. In FIG. 6C, the left edge of the display area 300 is at lock point "C" in each of the layers 610, 612, 614. In FIG. 6D, the left edge of the display area 300 is at lock point "D" in each of the layers 610, 612, 614.

The lock points shown in FIGS. 6A-6D are not generally representative of a complete set of lock points, and are limited to lock points "A," "B," "C" and "D" only for brevity. For example, right-edge lock points can be added to obtain alignment with the right edge of display area 300, or center lock points can be added to obtain alignment with the center of display area 300. Alternatively, fewer lock points can be used, more lock points can be used, or lock points can be omitted.

The direction of motion that can be caused in layers 610, 612, 614 by user 302 is indicated by a left-pointing arrow and a right-pointing arrow in FIGS. 6A-6D. The right-pointing and left-pointing arrows indicate possible movements (left or right horizontal movements) of the layers 610, 612, 614 in response to user movements. The system can interpret user movements to the left or right, even diagonal movements extending above or below the horizontal plane, as a valid leftward or rightward motion of a layer. Although the example shown in FIGS. 6A-6E shows the user 302 interacting with a portion of the display area 300 that corresponds to the content layer 614, the system does not require a user to interact with a part of a touchscreen corresponding to the display area occupied by the content layer 614. Instead, the system also allows interaction with other parts of the touchscreen (e.g., parts that correspond to display area occupied by other layers) to cause movement in the layers 610, 612, 614.

When the user input indicates a motion to the right or left, the system produces a rightward or leftward movement of the layers 610, 612, 614 relative to the display area 300. In this example, the amount of horizontal movement of the layers 610, 612, 614 is a function of the data in the layers and the size or rate of the motion made by the user. Layers 610, 612, 614 move horizontally according to the following rules, except during wrapping animations:

1. The horizontal movement of content layer 614 is locked to layer 612.
2. Layers 612 and 614 will each move horizontally at approximately three times the rate of layer 610, which is approximately 1/3 the length of layers 612 and 614.

Movement in the layers 610, 612, 614 may differ from the rules described above in some circumstances. In the example shown in FIGS. 6A-6E, wrapping is permitted.

The arrows indicate that a user can navigate left from the beginning of the content layer 614 (the position shown in FIGS. 6A and 6E), and can navigate right from the end of the content layer 614 (the position shown in FIG. 6D). During a wrapping animation, some layers may move faster or slower than during other kinds of movements. In the example shown in FIGS. 6A and 6D, the text in layer 610 moves faster when wrapping back to the beginning of content layer 614. In FIG. 6D, display area 300 shows portions two letters in layer 610, at the end of the "Games" text string. A wrapping animation to return to the state shown in FIG. 6A can include bringing the data in layers 610, 612, 614, including the text of layer 610, into view from the right, resulting in a more rapid movement in layer 610 than in other contexts, such as the transition from the state shown FIG. 6A to the state shown in FIG. 6B.

Example 6

Movements of Layer Elements

In addition to movements of entire layers, a user also can cause movements in elements or parts of layers, depending on the data in the layer and how the layer is arranged. For example, a user can cause movements (e.g., vertical movements) in layer elements (e.g., lists) that are orthogonal or substantially orthogonal to movements (e.g., horizontal movements) that can be caused in a layer as a whole. Orthogonal movements of layer elements in layers that move horizontally can include scrolling vertically in a list embedded in a content layer, such as when the list contains more information than can be displayed in a display area. Alternatively, a system that presents layers that move vertically can allow horizontal movements in layer elements.

Figure 6E:
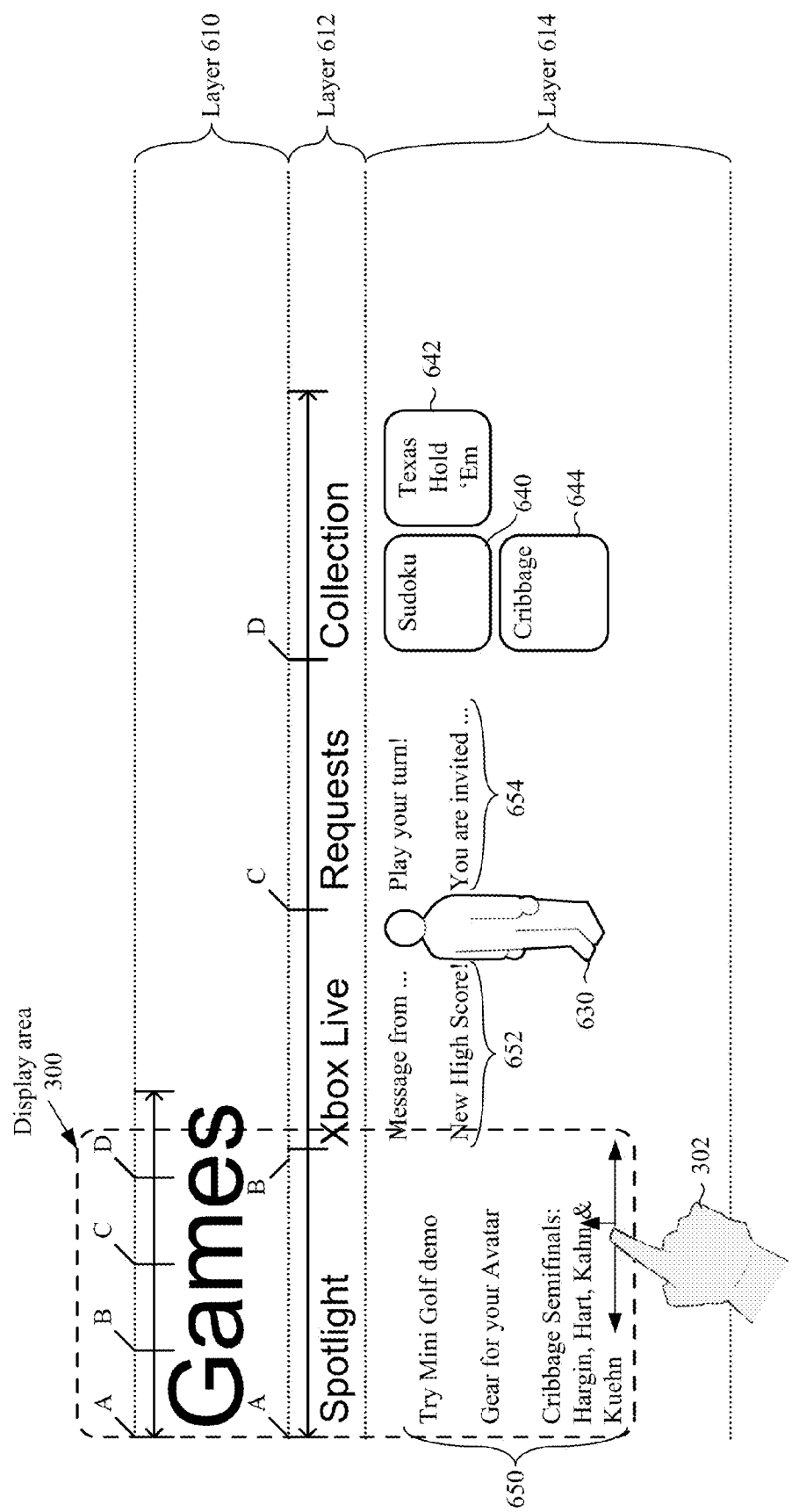
FIG. 6E is a diagram showing the multiple UI layers of FIGS. 6A-6D, with possible upward and downward motion indicated for a list in a content layer, according to one or more described embodiments.

In FIGS. 6A and 6E, list 650 in content layer 614 contains more information than is visible in display area 300. The system can interpret upward or downward movements made by user 302, including diagonal movements extending to the left or right of the vertical plane, as a valid upward or downward motion of list 650. The amount of movement of list 650 can be a function of the size or rate of the motion made by user 302, and the data in list 650. Thus, scrolling of the list 650 can be item-by-item, page-by-page of items, or something in between that depends on size or rate of the motion. In this example, list 650 includes only one list item that is not visible in display area 300 in FIG. 6A, so a range of small or large downward movements can be sufficient to scroll to the end of list 650. As shown in FIGS. 6A and 6E, the vertical position of other visual information in the layers (e.g., visual information in content layer 614 outside the list 650, or visual information in other layers) is not affected by upward or downward movements. In this example, movements of the layers as a whole (including wrapping animations and locking animations that affect the layers as a whole) are constrained to horizontal motion (a primary axis of motion). The list 650 is an example of a user interface element within a layer that also permits motion along a secondary axis (e.g., vertical motion) that is orthogonal to the motion in the layers as a whole.

FIGS. 6A and 6E show user 302 interacting with a portion of the display area 300 that corresponds to list 650 in content layer 614. Alternatively, the system can allow interaction with other parts of a touchscreen (e.g., parts that correspond to portions of display area 300 occupied by other layers) to cause an upward or downward movement in list 650.

The direction of motion that can be caused by user 302 is indicated by a left-pointing arrow and a right-pointing arrow in FIGS. 6A and 6E, along with an additional down-pointing arrow in FIG. 6A and an additional up-pointing arrow in FIG. 6E. The right-pointing and left-pointing arrows indicate possible movements (left or right horizontal movements) of the layers 610, 612, 614 in response to user movements. The down-pointing and up-pointing arrows indicate possible movements (up or down vertical movements) of list 650 in response to user movements. User 302 can move left or right in content layer 614 after making an up or down movement in list 650. The current position of list 650 (e.g., the bottom-of-list position indicated in FIG. 6E) can be saved, or the system can revert to a default position (e.g., the top-of-list position indicated in FIG. 6A) when navigating left or right in content layer 614 from list 650. Although the arrows in. FIGS. 6A-6E (and other figures) that indicate possible movements are shown for purposes of explanation, the display area 300 can itself display graphical indicators (such as arrows or chevrons) of possible movements for the layers and/or list.

Example 7

Movement in Layers with Elements Capable of Orthogonal Movements

Figure 7:
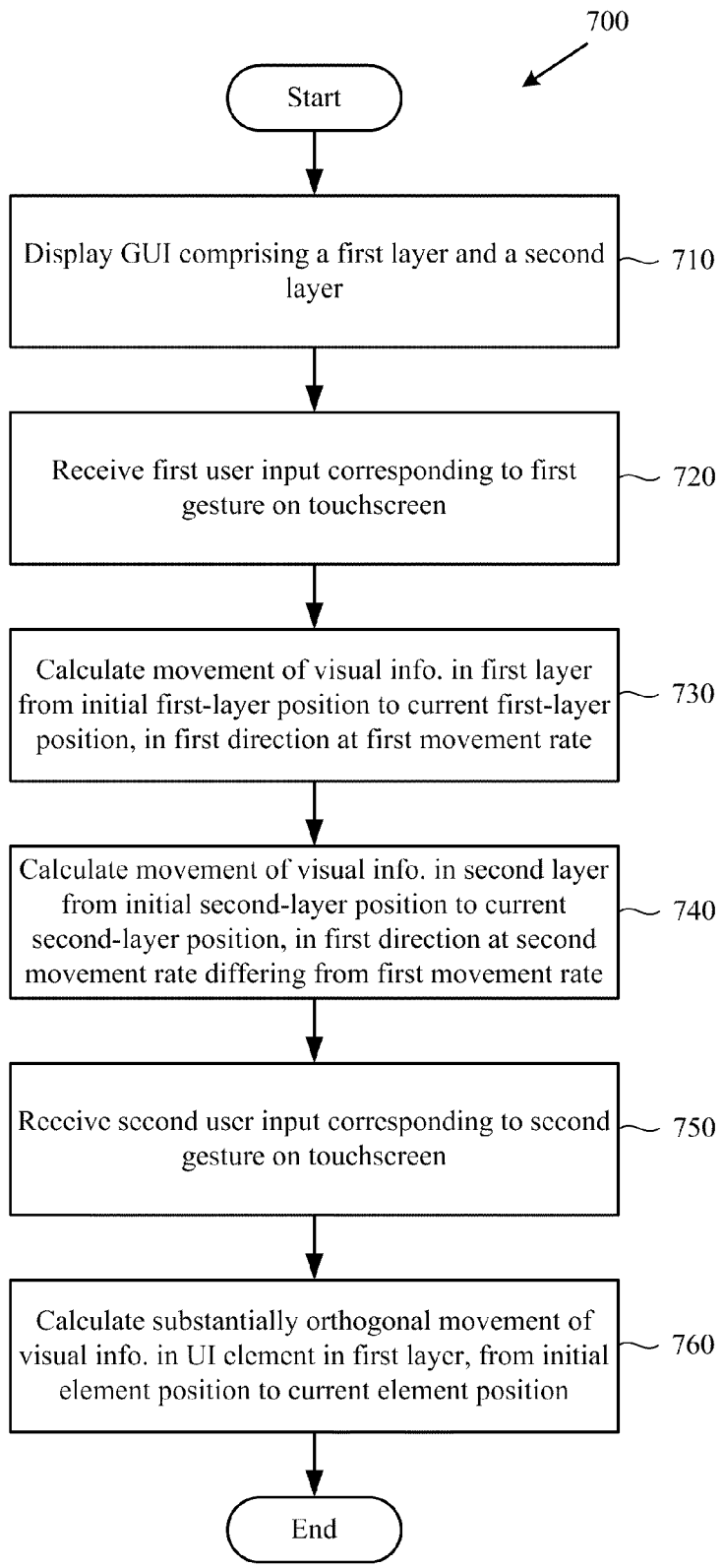
FIG. 7 is a flow chart showing an example technique in which a UI system calculates movements in a first direction in a multi-layer GUI having at least one layer with a UI element that is operable to move in a second direction that is orthogonal to the first direction, according to one or more described embodiments.

FIG. 7 is a flow chart showing an example technique 700 in which a UI system calculates movements in a first direction (e.g., a horizontal direction) in a multi-layer GUI (e.g., the GUI shown in FIGS. 6A-6E) having at least one layer with a UI element that is operable to move in a second direction that is orthogonal (or substantially orthogonal) to the first direction.

At 710, the UI system displays a graphical user interface comprising plural layers. A first layer (e.g., content layer 614) comprises a user interface element (e.g., list 650) operable to move in a second direction (e.g., a vertical direction) substantially orthogonal to the first direction (e.g., a horizontal direction). A first portion of visual information (e.g., list 652 as shown in FIG. 6B) in the first layer is within a display area (e.g., display area 300) of a touchscreen.

At 720, the UI system receives first user input corresponding to a first gesture on the touchscreen. At 730, the UI system calculates a first movement based at least in part on the first user input. The first movement is a movement of the first layer from an initial first-layer position (e.g., the position shown in FIG. 6B) in which a second portion of visual information (e.g., list 650) in the first layer is outside the display area to a current first-layer position (e.g., the position shown in FIG. 6A) in which the second portion of visual information in the first layer is within the display area. The first movement is in a first direction (e.g., a leftward, horizontal direction) at a first movement rate. At 740, the UI system calculates a second movement substantially parallel to the first movement based at least in part on the first user input. The second movement is a movement of visual information in the second layer from an initial second-layer position (e.g., the position shown in FIG. 6B) to a current second-layer position (e.g., the position shown in FIG. 6A). The second movement is in the first direction (e.g., the leftward, horizontal direction) at a second movement rate that differs from the first movement rate.

At 750, the UI system receives second user input corresponding to a second gesture on the touchscreen. At 760, the UI system calculates a substantially orthogonal movement (e.g., a vertical movement) based at least in part on the second user input. The substantially orthogonal movement is a movement of visual information in the user interface element of the first layer from an initial element position to a current element position.

The substantially orthogonal movement can be a movement of visual information in a vertically scrollable element (e.g., list 650) from an initial vertical position (e.g., the position of list 650 as shown in FIG. 6A) to a current vertical position (e.g., the position of list 650 as shown in FIG. 6E). The current vertical position can be calculated based on, for example, the initial vertical position and a velocity of the second gesture. A portion of visual information in the vertically scrollable element can be outside the display area when the vertically scrollable element is in the initial vertical position (e.g., the position of list 650 as shown in FIG. 6A) and within the display area when the vertically scrollable element is in the current vertical position (e.g., the position of list 650 as shown in FIG. 6E).

The movements can be animated and/or rendered for display (e.g., on a touchscreen of a mobile phone or other computing device).

Example 8

Avatar

Layers can include elements that indicate relationships between other elements, such as other elements in a layer or sections of a layer. Elements that indicate relationships between other elements can be contained in a separate layer, or in the same layer as the respective other elements. For example, an avatar layer can include a visual element (an avatar) with a scope of motion that spans two related sections in another layer that relate to a user. Other elements also can be used to indicate relationships between elements. For example, an image of a music artist could be used to indicate a relationship between a list of albums by the artist and a list of tour dates for the artist.

In FIGS. 6A-6E, avatar 630 is associated with lists 652, 654 in the content layer, and the headings above the lists 652, 654 in layer 612 ("Xbox Live" and "Requests," respectively). Avatar 630 can provide a visual cue to indicate a relationship between or draw attention to parts of the content layer (e.g., lists 652, 654). In FIG. 6B, avatar 630 is positioned between list 652 and list 654. In FIG. 6C, avatar 630 floats behind the text of list 654, but remains completely within display area 300. In FIG. 6D, avatar 630 is only partially within display area 300, and the part that is within display area 300 floats behind game icons 640, 642, 644. The positioning of avatar 630 at the left edge of display area 300 can indicate to the user 302 that information associated with avatar 630 (e.g., lists 652, 654) is available if the user 302 navigates in the direction of avatar 630. Avatar 630 can move at varying speeds. For example, avatar 630 moves faster in the transition between FIGS. 6B and 6C than it does in the transition between FIGS. 6C and 6D.

Alternatively, avatar 630 can move in different ways, or exhibit other functionality. For example, avatar 630 can be locked to particular position (e.g., a lock point) in content layer 614 or in some other layer, such that avatar 630 moves at the same horizontal rate as the layer to which it is locked. As another alternative, avatar 630 can be associated with a list that can be scrolled up or down, such as list 650, and move up or down as the associated list is scrolled up or down.

Example 9

Background Layer

Figure 8A:
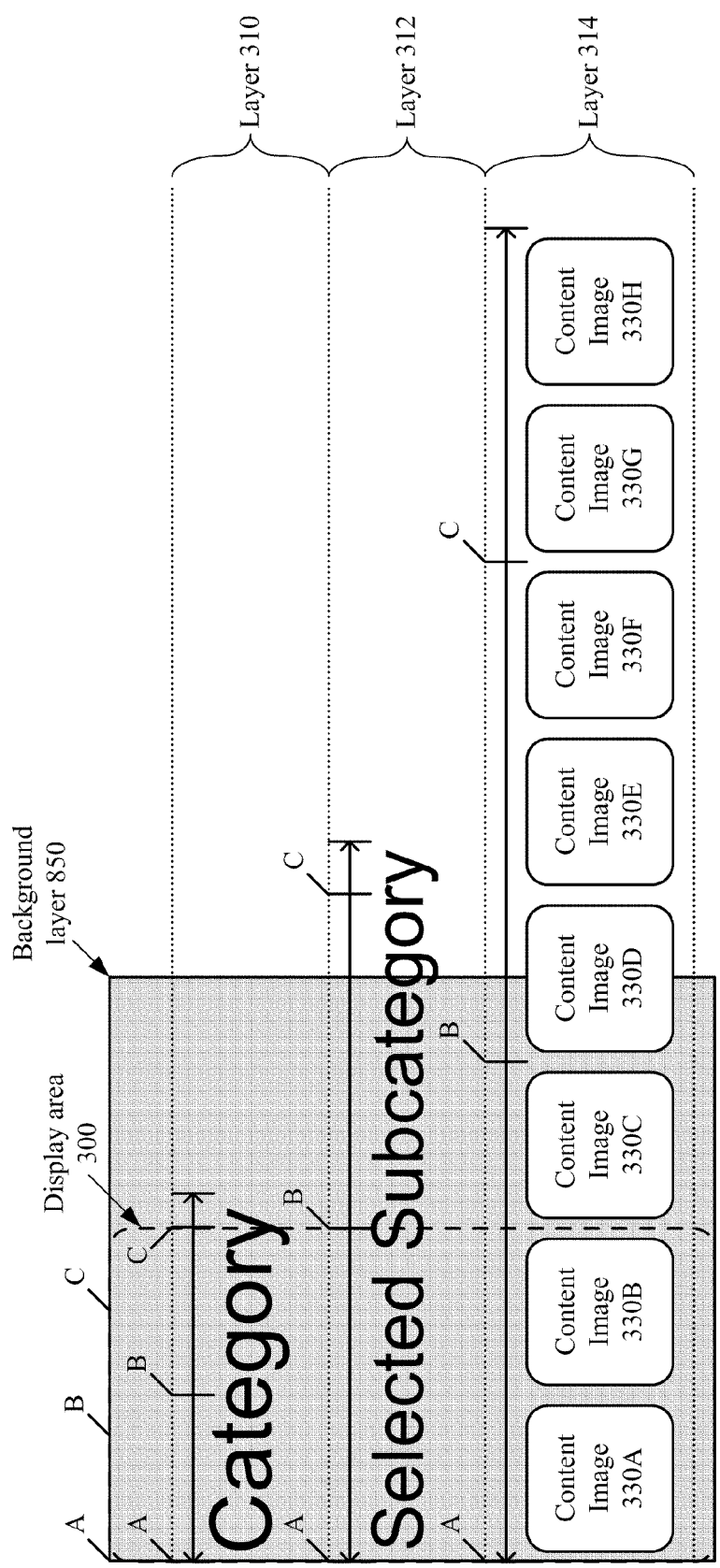
FIGS. 8A-8C are diagrams showing multiple UI layers including a background layer, according to one or more described embodiments.
Figure 8B:
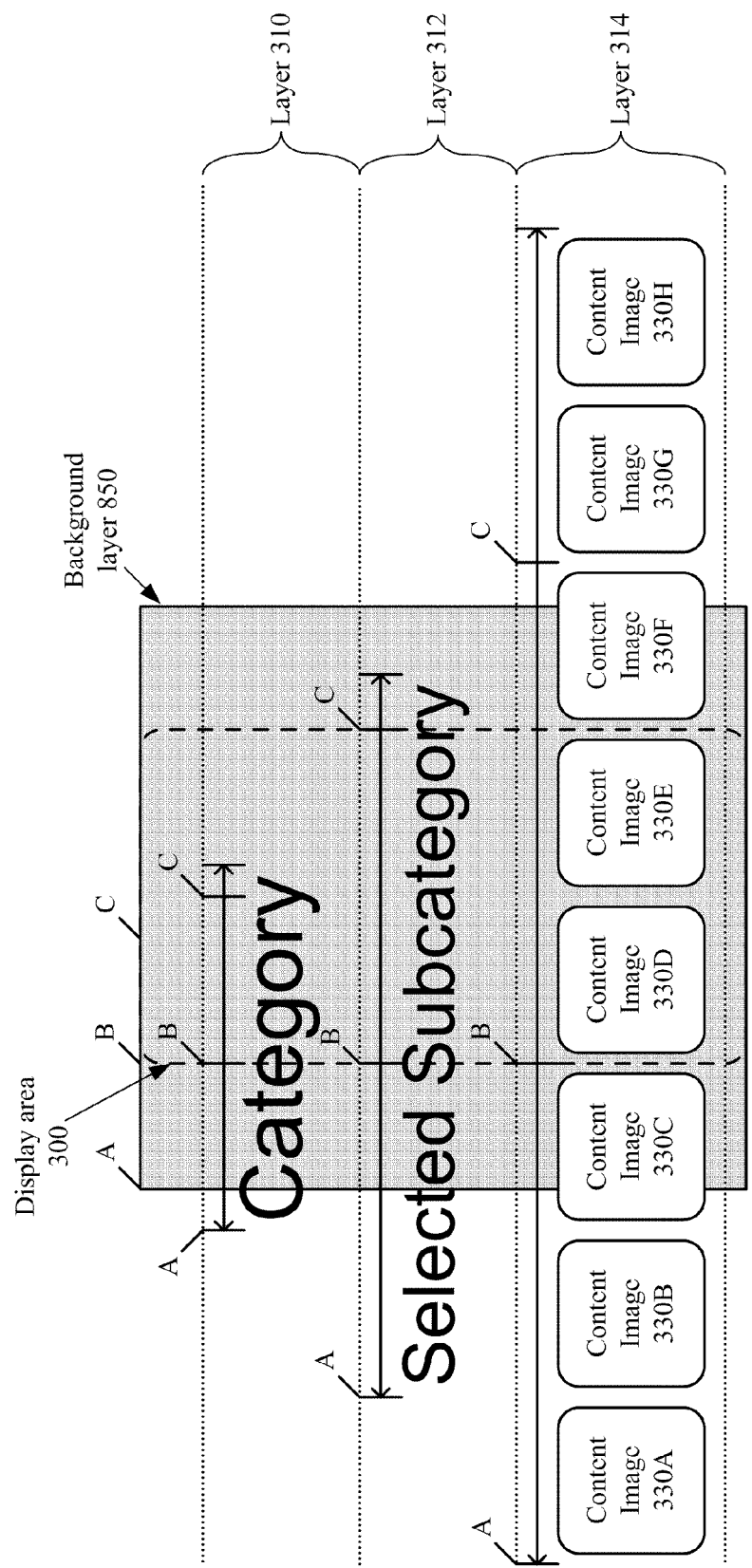
Figure 8C:
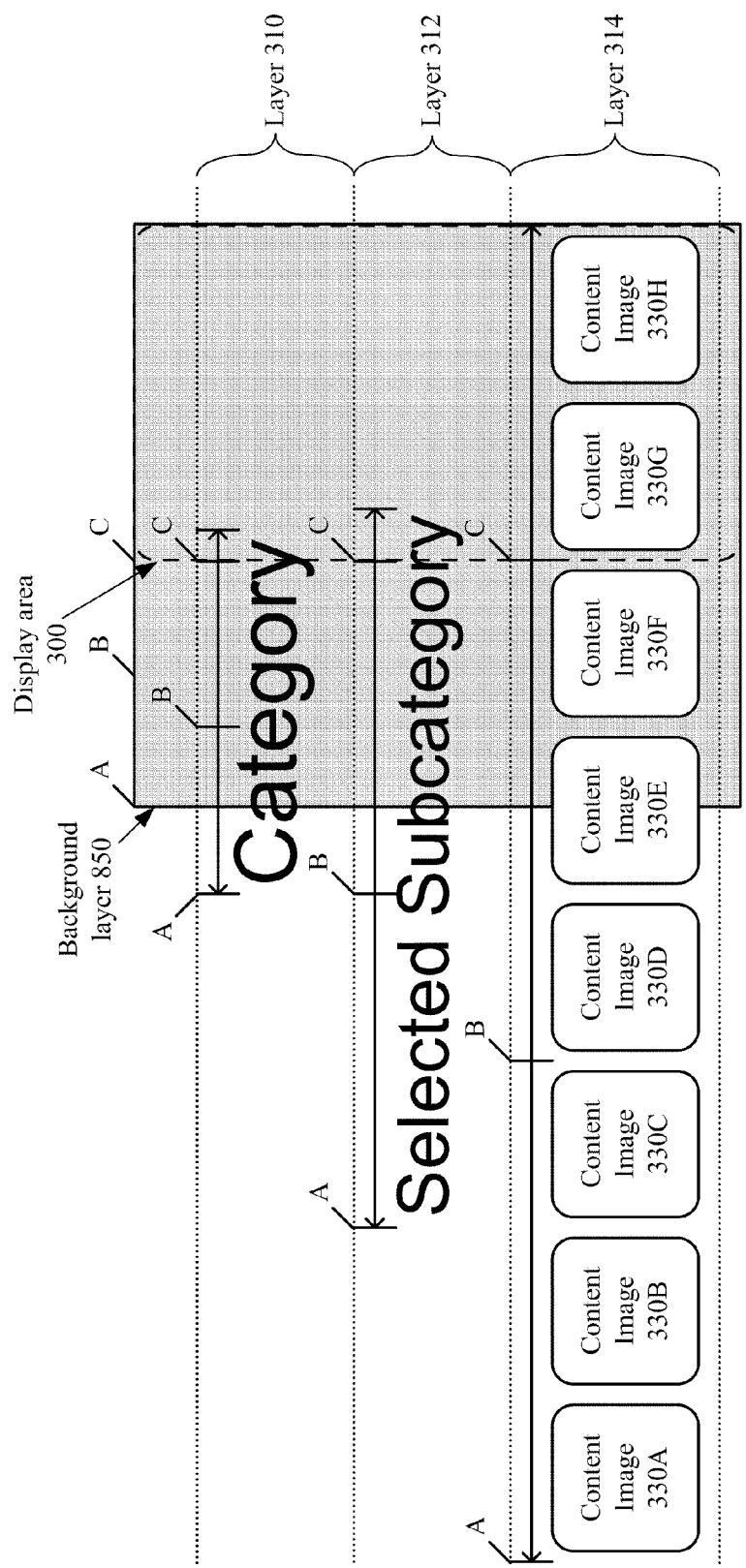

FIGS. 8A-8C are diagrams showing a GUI presented by a multi-layer UI system with three layers 310, 312, 314 and a background layer 850. In this example, a user 302 (represented by the hand icon) interacts with content layer 314 by interacting with a touchscreen having a display area 300.

Background layer 850 floats behind the other layers. Data to be presented visually in background layer 850 can include, for example, an image that extends beyond the boundaries of display area 300. The content layer 314 includes content elements (e.g., content images 330A-H). Layers 310, 312 include text information ("Category" and "Selected Subcategory," respectively). The length of content layer 314 is indicated to be approximately twice the length of layer 312, which is in turn indicated to be approximately twice the length of layer 310. The length of background layer 850 is indicated to be slightly less than the length of layer 312.

In FIGS. 8A-8C, the direction of motion that can be caused in the layers 310, 312, 314, 850 by user 302 is indicated by a left-pointing arrow and a right-pointing arrow. These arrows indicate possible movements (left or right horizontal movements) of layers 310, 312, 314, 850 in response to user movements. In this example, the system interprets user movements to the left or right, even diagonal movements extending above or below the horizontal plane, as a valid leftward or rightward motion of a layer. Although FIGS. 8A-8C show user 302 interacting with a portion of display area 300 that corresponds to content layer 314, the system also allows interaction with other parts of the touchscreen (e.g., parts that correspond to portions of display area 300 occupied by other layers) to cause movement in layers 310, 312, 314, 850.

When user input indicates a motion to the right or left, the system produces a rightward or leftward movement of the layers 310, 312, 314, 850 relative to display area 300. The amount of movement of layers 310, 312, 314, 850 is a function of the data in the layers and the size or movement rate (or velocity) of the motion made by the user.

In FIGS. 8A-8C, example left-edge lock points "A," "B" and "C" are indicated for layers 310, 312, 314, 850. The left-edge lock points indicate the corresponding position of the left edge of the display area 300 on each layer. For example, when a user navigates to a position on content layer 314 such that the left edge of display area 300 is at lock point "A," the left edge of display area 300 will also be aligned at lock point "A" of the other layers 310, 312, 850, as shown in FIG. 8A. In FIG. 8B, the left edge of display area 300 is at lock point "B" in each of the layers 310, 312, 314, 850. In FIG. 8C, the left edge of the display area 300 is at lock point "C" in each of the layers 310, 312, 314, 850.

The lock points shown in FIGS. 8A-8C are not generally representative of a complete set of lock points, and are limited to lock points "A," "B" and "C" only for brevity. For example, left-edge lock points can be set for each of the content images 330A-330H. Alternatively, fewer lock points can be used, or lock points can be omitted. As another alternative, lock points can indicate other kinds of alignment. For example, right-edge lock points can indicate alignment with the right edge of display area 300, or center lock points can indicate alignment with the center of display area 300.

In this example, layers 310, 312, 314, 850 move according to the following rules, except during wrapping animations:

1. Content layer 314 will move at approximately twice the rate of layer 312, which is approximately half the length of layer 314.
2. Layer 312 will move at approximately twice the rate of layer 310, which is approximately half the length of layer 312.
3. Content layer 314 will move at approximately four times the rate of layer 310, which is approximately ¼ the length of layer 314.
4. Background layer 850 will move slower than layer 310. Although background layer 850 is longer than layer 310, the distance to be moved between neighboring lock points (e.g., lock points "A" and "B") in layer 310 is greater than the distance between the corresponding lock points in background layer 850.

Movement of layers 310, 312, 314, 850 may differ from the rules described above in some circumstances. In this example, wrapping is permitted. User 302 can navigate left from the beginning of content layer 314 (the position shown in FIG. 8A), and can navigate right from the end of content layer 314 (the position shown in FIG. 8C). During a wrapping animation, some layers may move faster or slower than during other kinds of movements. In this example, the image in background layer 850 and the text in layers 310 and 312 moves faster when user input causes wrapping back to the beginning of content layer 314. In FIG. 8C, display area 300 shows portions of one and two letters, respectively, in layers 310 and 312, at the end of the respective text strings. Display area 300 also shows the rightmost portion of the image in background layer 850. A wrapping animation to return to the state shown in FIG. 8A can include bringing the leftmost portion of the image in background layer 850 and the beginning of the text in layers 310, 312 into view from the right. This results in a more rapid movement in layers 310, 312 and 850 than in other contexts, such as the transition from the state shown FIG. 8A to the state shown in FIG. 8B.

Example 10

Multi-Layer UI System

Figure 9:
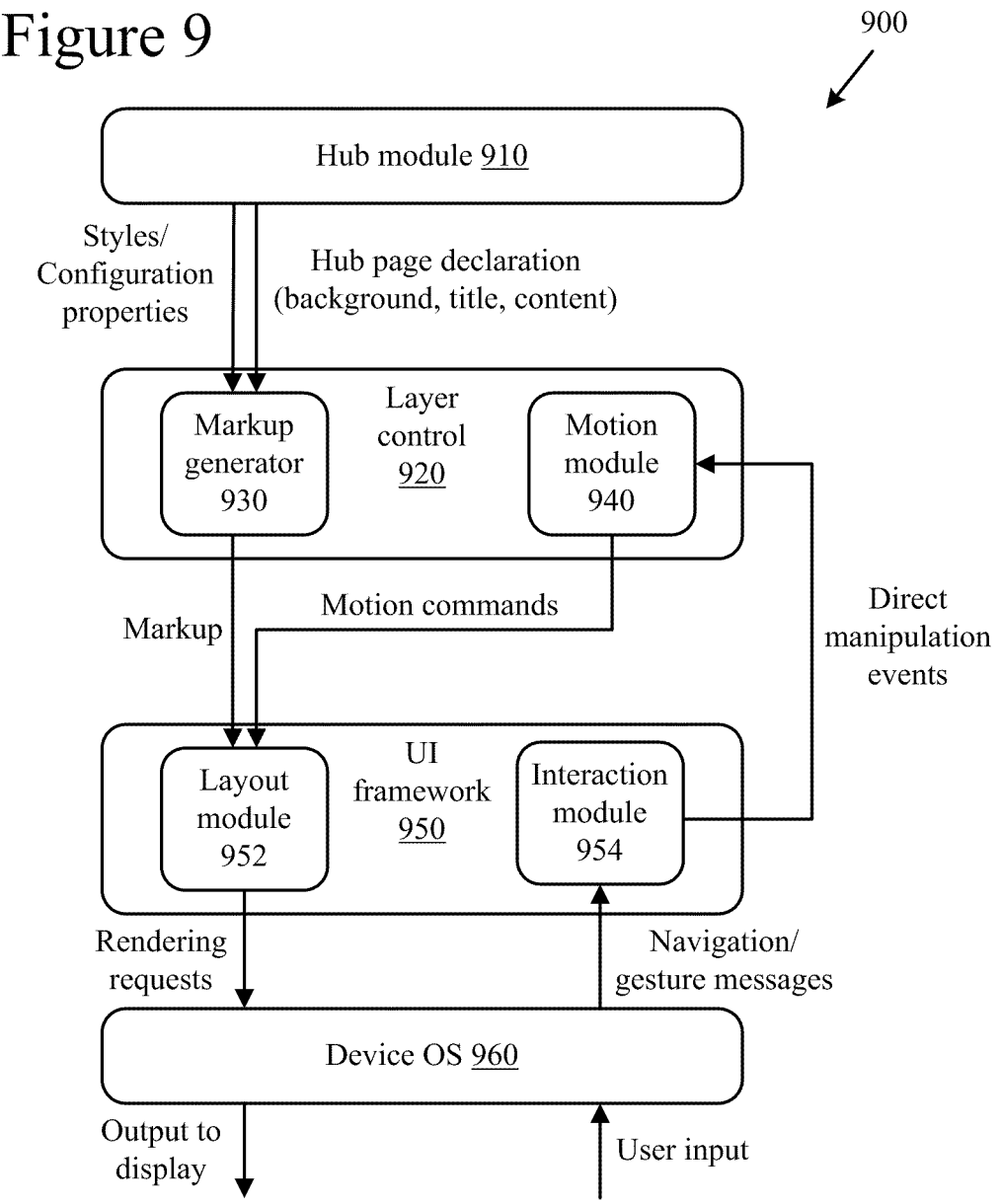
FIG. 9 is a system diagram showing a multi-layer UI system in which described embodiments can be implemented.

FIG. 9 is a system diagram showing an example multi-layer UI system 900 that presents multiple UI layers on a device (e.g., a smartphone or other mobile computing device). The system 900 can be used to implement functionality described in other examples, or other functionality.

In this example, the system 900 includes a hub module 910 that provides a declarative description of a hub page to layer control 920, which controls display of parallel UI layers. Layer control 920 also can be referred to as a "panorama" or "pano" control. Such a description can be used when the UI layers move in a panoramic, or horizontal, fashion. Alternatively, layer control 920 controls UI layers that move vertically, or in some other fashion. Layer control 920 includes markup generator 930 and motion module 940.

In this example, layer control 920 controls several layers of UI elements: e.g., a background layer, a title layer, a section header layer, and a content layer. The content layer includes a set of content panes. Content panes can include, for example, images, graphical icons, lists, text, or other information to be presented visually. A set of content panes in a content layer can be referred to as a "generation" of content panes. Alternatively, layer control 920 controls greater than or less than three layers, or different kinds of layers. The declarative description of the hub page includes information that defines UI elements. In a multi-layer UI system, UI elements can include multiple layers, such as a background layer, a title layer, a section header layer, and a content layer. The declarative description of the hub page is provided to markup generator 930, along with other information such as style information and/or configuration properties. Markup generator 930 generates markup that can be used to render the UI layers. Motion module 940 accepts events (e.g., direct UI manipulation events) generated in response to user input and generates motion commands. The motion commands are provided along with the markup to a UI framework 950. In the UI framework 950, the markup and motion commands are received in layout module 952, which generates UI rendering requests to be sent to device operating system (OS) 960. The device OS 960 receives the rendering requests and causes a rendered UI to be output to a display on the device. System components such as hub module 910, layer control 920, and UI framework 950 also can be implemented as part of device OS 960. In one implementation, the device OS 960 is a mobile computing device OS.

A user (not shown) can generate user input that affects the way the UI is presented. In the example shown in FIG. 9, the layer control 940 listens for direct UI manipulation events generated by UI framework 950. In UI framework 950, direct UI manipulation events are generated by interaction module 954, which receives gesture messages (e.g., messages generated in response to panning or flick gestures by a user interacting with a touchscreen on the device) from device OS 960. Device OS 960 includes functionality for recognizing user gestures and creating messages than can be used by UI framework 950. UI framework 950 translates gesture messages into direction UI manipulation events to be sent to layer control 920. Interaction module 954 also can accept and generate direct UI manipulation events for navigation messages generated in response to other kinds of user input, such as voice commands, directional buttons on a keypad or keyboard, trackball motions, etc.

Example 11

Detailed Implementation

This example describes a detailed implementation comprising aspects of examples described above, along with other aspects. This detailed implementation can be implemented by a multi-layer UI system such as system 900 described above, or by some other system.

In this example, the system 900 presents multiple parallel UI layers (e.g., a background layer, a title layer, a section header layer, and a content layer) that move horizontally. The content layer includes several content panes. Each content pane includes a right lock point and a left lock point.

A. Initialization

To initialize the parallel UI layers, the system 900 obtains information about the effective length of the background layer, the title layer, the section header layer and the content layer. (For UI layers that move horizontally, the effective length can be considered to be the effective width of the UI layers.) The system 900 can reduce memory and processing demands by dynamically creating content panes as they approach the display area, but this makes it more difficult to determine the effective width of the content layer. In this example, to determine an effective width of the content layer at initialization, the system 900 determines a maximum content layer width based on a maximum width for each content pane, and calculates a sum of the maximum widths of all content panes, which are non-overlapping.

Lock points in the content layer (for content panes) can be set automatically, for example, by dividing the content layer in increments of the width of the display area, to yield non-overlapping content panes. Alternatively, lock points can be set in the content layer by determining how many whole content images n fit in a content pane and starting a new content pane every n content images until each content image is in at least one content pane, which potentially yield overlapping content panes.

Motion in the layers is calculated based on motion ratios. For example, the system 900 calculates motion ratios for the background layer and the title layer by dividing the width of the background layer and the width of the title layer, respectively, by the maximum width of the content layer. Taking into account the widths of the background layer and the title layer, the system 900 maps locations of lock points in the background layer and the title layer, respectively, based on the locations of corresponding lock points in the content layer. An example of such a mapping of locations in a background layer is shown in FIG. 1.

The lock points are used when moving the corresponding layers. For example, when the system 900 animates a transition to a pane in the content layer, the system looks up appropriate lock point positions for the background layer and the title layer and issues a command for the layers to scroll to those positions, setting relative motion rates depending on distances between lock points in the respective layers.

Motion ratios that are based on a maximum length of a content layer will only be approximate when compared with an actual rendered content layer. Because the ratios are approximate (the final width of the content panes is still unknown), the system 900 can perform lock animations to adjust layers such as the background layer or the title layer so that they align with corresponding lock points in a rendered final content layer.

Once initialization is complete, the system 900 can render the UI layers and begin accepting user input.

B. User Input

In this example, the system 900 accepts user input from a user interacting with a touchscreen on a mobile computing device. The system 900 can distinguish between different gestures on the touchscreen, such as drag gestures, pan gestures and flick gestures. The system 900 can also detect a tap gesture, such as where the user touches the touchscreen in a particular location, but does not move the finger, stylus, etc. before breaking contact with the touchscreen. As an alternative, some movement is permitted, within a small threshold, before breaking contact with the touchscreen in a tap gesture. The system 900 also can detect multi-touch gestures, such as pinch-and-stretch gestures.

The system 900 interprets an interaction as a particular gesture depending on the nature of the interaction with the touchscreen. The system 900 obtains one or more discrete inputs from a user's interaction. A gesture can be determined from a series of inputs. For example, when the user touches the touchscreen and begins a movement in a horizontal direction while maintaining contact with the touchscreen, the system 900 fires a pan input and begins a horizontal movement in the layers. The system 900 can continue to fire pan inputs while the user maintains contact with the touchscreen and continues moving. For example, the system 900 can fire a new pan input each time the user moves N pixels while maintaining contact with the touch screen. In this way, a continuous physical gesture on a touchscreen can be interpreted by the system 900 as a series of pan inputs. The system can continuously update the contact position and rate of movement.

When the physical gesture ends (e.g., when user breaks contact with the touchscreen), the system 900 can determine whether to interpret the motion at the end as a flick by determining how quickly the user's finger, stylus, etc., was moving when it broke contact with the touchscreen, and whether the rate of movement exceeds a threshold.

C. Responding to User Gestures

The system 900 can render motion (e.g., motion in a layer, list, or other UI element) on the display differently depending on the type of gesture. For example, in the case of a horizontal drag gesture (in which the user is currently maintaining contact with the touchscreen), the system 900 moves the content layer in a horizontal direction by the same distance as the horizontal distance of the drag. The title layer and background layer also move in response to the drag. The amount of movement is determined by multiplying the motion ratio for the respective layer by the horizontal movement of the drag. For example, if a motion ratio of 0.5 has been determined for the title layer, and the horizontal distance of the drag is 100 pixels, the movement in the title layer is 50 pixels in the direction of the drag.

In the case of a pan gesture (in which the user was moving more slowly, or was stopped, when the user broke contact with the touchscreen), moves the content layer in the amount of the pan, and checks the current position of the content pane relative to the display area of the device to determine whether to perform an additional movement in the content layer. For example, the system can perform a locking animation (i.e., an animation of a movement in the content layer to snap to a lock point) and move the content layer to a left or right lock point associated with a current content pane. The system 900 can determine which lock point associated with the current pane is closer, and transition to the closer lock point. As another example, the system 900 can move the content layer in order to bring a content pane that is in partial view on the display area into full view. Other gestures also can cause a content pane to be brought into full view. For example, if the left or right side of a vertically scrollable list is outside the display area, a gesture on the list (e.g., a vertical or substantially vertical gesture) can cause a horizontal movement in the content layer (and horizontal movement in other layers, as appropriate) so that the whole list becomes visible. The horizontal movement of the layers may be in addition to any vertical movement in the list caused by the vertical gesture, but the vertical position of the content layer and any other layers are not affected. Alternatively, the system 900 can maintain the current position of the content layer.

In one implementation, the system 900 performs the following steps:

1. In the content layer, check how much area of the current, previous and next content panes are visible, and check the locations of the edges.
2. If the right edge of the previous pane has been moved further into the display area (relative to the left screen edge) than a threshold number of pixels, then transition to the previous pane. In one implementation, the threshold is referred to as a "bump threshold displacement."
3. If the left edge of the next pane has been moved further into the display area (relative to the right screen edge) than threshold number of pixels, then transition to the next pane.
4. Otherwise, determine whether the content layer can be moved to align left or right edges of current panes with lock points or "bumps." If the left edge of the current pane is close enough to the left lock location, lock the current pane to the left edge. Otherwise, if the right edge of current pane is close enough to the right lock location, and the current pane is wider than screen, lock it to the right edge.

In the case of a flick gesture (in which the user was moving more rapidly when the user broke contact with the touch-screen), the system 900 initiates a transition animation that can advance the content layer to the next content pane or the previous content pane, depending on the direction and velocity of the flick gesture. If the velocity of the flick is large enough, the system 900 can transition to the next content pane in that direction. If the velocity isn't strong enough, or if a current content pane is wide, the system 900 can move the content layer in the direction of the flick without actually transitioning to the next content pane. The threshold velocity for a flick to be detected (i.e., to distinguish a flick gesture from a pan gesture) can vary depending on implementation. The threshold velocity for a flick to cause a transition to another content pane also can vary depending on implementation.

D. Non-linear Motion

UI layers exhibit non-linear movement rates in some circumstances. For example, entire layers can move at different rates depending on context, or parts of layers can move at different rates than other parts of the same layer depending on context. One layer that can exhibit non-linear movement rates is a section header layer. A section header layer can be divided into several section headers, and each header can be associated with one or more content panes in the content layer.

In this example, the system 900 provides a section header layer, and each section header is associated with a content pane. The section header layer in this example moves according to the following rules:

1. If the content pane is no wider than the display area, the header remains locked to the content pane. Otherwise rules 2-4 apply where the content pane is wider than the display area.
2. The left edge of each header aligns with the left edge of the content pane, when the layer is locked on the left side lock point for the pane.
3. The header moves slower than the content pane when the user pans the content pane to the left. This can be useful, for example, to allow the user to still see some portion of the header when panning.
4. The header moves faster than the content pane when the user pans to the right. This can be useful, for example, to allow a transition effect where, when there is a transition from the current pane to the previous pane, the header moves a little faster than the content pane but both align on the left lock point.

In performing movements according to these rules, system 900 calculates a displacement value. First, a maximum displacement is calculated by taking the difference between the content pane width and the header width. In calculating the maximum displacement, the system 900 also can include an additional margin for buttons or other functional items in the header, and not just the width of text in the header.

The system 900 then calculates an actual displacement by determining the location of the left edge of the current pane relative to the left lock point. If the pane's left edge is to the right of the left lock point, the system 900 subtracts the horizontal position (x coordinate) of the left lock point from the horizontal position (x coordinate) of the left edge of the pane, which will be a positive value a. If the pane's left edge is to the left of the left lock point, the system 900 subtracts the horizontal position (x coordinate) of the left edge of the pane from the horizontal position (x coordinate) of the left lock point, which will be a positive value b. Adjustments can be made to the value (a or b), such as by multiplying the value by a constant. After any adjustments, if the value (a or b) is greater than the maximum displacement, the value is capped at the maximum displacement.

Displacement calculations also can be used for panning and transition animations. In the latter case, before the transition starts, the final locations of the panes are calculated and, based on that, final locations of the headers to be used in the transition animations are calculated.

E. Edge Taps

The system 900 also can implement edge tap functionality. In an edge tap, a user can tap within a given margin (e.g., 40 pixels) of edges (e.g., left or right edges) of the display area to cause a transition (e.g., to a next content pane or a previous content pane). This can be useful for example, where the next pane or previous pane is partially in view in the display area. The user can tap near the next or previous pane to cause the system to bring that pane completely into the display area.

II. Extensions and Alternative Implementations

Various extensions and alternatives to the embodiments described herein are possible.

In described examples, content layers are typically described as being longer than other layers, such as a background layer. A multi-layer UI system such as system 900 also can handle scenarios where layers such as a title layer or background layers are actually wider than the content layer. In such scenarios, the speed of the motion in the layers can be adjusted automatically adjusted to compensate. For example, where a content layer is shorter than a title layer, the content layer can move slower than the title layer.

In described examples, some layers are described as being locked to other layers. For example, in FIGS. 6A-6E, portions of layer 612 are indicated as being locked to parts of content layer 614. In other described examples, some layers are described moving more flexibly. For example, in FIGS. 5A-5D, sections of section header layer 512 are indicated as being associated with particular parts of content layer 514, but the sections are able to move independently from one another and float over parts of content layer 514. A multi-layer UI system can combine such functionality. For example, a multi-layer UI system can lock some parts of a layer (e.g., a section header layer or a title layer) to content in a content layer, while allowing other parts of the layer to move independently.

A multi layer system also can lock layers together to improve transition or wrapping effects. For example, a background layer can be locked to a title layer such that the background layer and title layer move at the same speed during wrapping. Such locking can be done even when the effective length of the layers is different.

Described examples show different positions of layers that may be of interest to a user, such as content layers. A user can begin navigation in multi-layer UI system at the beginning of layers, or use different entry points to begin UI layer navigation. For example, a user can begin navigation in the middle of a content layer, at the end of a content layer, etc. This can be useful, for example, where a user has previously exited at a position other than the beginning of a layer (e.g., the end of a layer), so that the user can return to the prior location (e.g., after a user uses an application invoked by actuating a content image). As another example, default lock points may be based on a prior state of the UI layers. For example, a user can return to a layer at lock point corresponding to a part of a layer that was being viewed previously. As another example, a multi-layer UI system can save states or make adjustments in more than one layer to allow different entry points. For example, if a user makes an entry where a content layer and a feature layer are visible as shown in FIG. 5C, a multi-layer UI system can adjust layer 510 such that the beginning of the "Application" text in layer 510 is aligned with the beginning of the "Feature 2" text in layer 512.

III. Example Computing Environment

Figure 10:
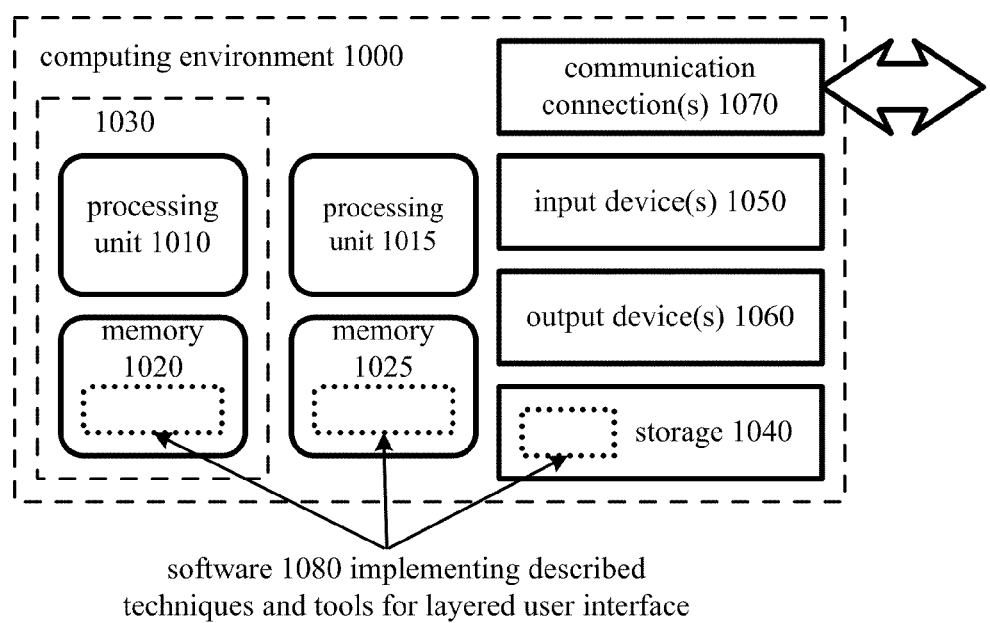
FIG. 10 illustrates a generalized example of a suitable computing environment in which several of the described embodiments may be implemented.

FIG. 10 illustrates a generalized example of a suitable computing environment 1000 in which several of the described embodiments may be implemented. The computing environment 1000 is not intended to suggest any limitation as to scope of use or functionality, as the techniques and tools described herein may be implemented in diverse general-purpose or special-purpose computing environments.

With reference to FIG. 10, the computing environment 1000 includes at least one CPU 1010 and associated memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. FIG. 10 shows a second processing unit 1015 (e.g., a GPU or other co-processing unit) and associated memory 1025, which can be used for video acceleration or other processing. The memory 1020, 1025 may be volatile memory (e.g., registers, cache, RAM), non-volatile memory (e.g., ROM, EEPROM, flash memory, etc.), or some combination of the two. The memory 1020, 1025 stores software 1080 for implementing a system with one or more of the described techniques and tools.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, DVDs, memory cards, or any other medium which can be used to store information and which can be accessed within the computing environment 1000. The storage 1040 stores instructions for the software 1080 implementing described techniques and tools.

The input device(s) 1050 may be a touch input device such as a keyboard, mouse, pen, trackball or touchscreen, an audio input device such as a microphone, a scanning device, a digital camera, or another device that provides input to the computing environment 1000. For video, the input device(s) 1050 may be a video card, TV tuner card, or similar device that accepts video input in analog or digital form, or a CD-ROM or CD-RW that reads video samples into the computing environment 1000.

The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 1000, computer-readable media include memory 1020, 1025, storage 1040, and combinations thereof.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. Any of the methods described herein can be implemented by computer-executable instructions encoded on one or more computer-readable media (e.g., computer-readable storage media or other tangible media).

For the sake of presentation, the detailed description uses terms like "select" and "determine" to describe computer operations in a computing environment. These terms are high-level abstractions for operations performed by a computer, and should not be confused with acts performed by a human being. The actual computer operations corresponding to these terms vary depending on implementation.

IV. Example Implementation Environment

Figure 11:
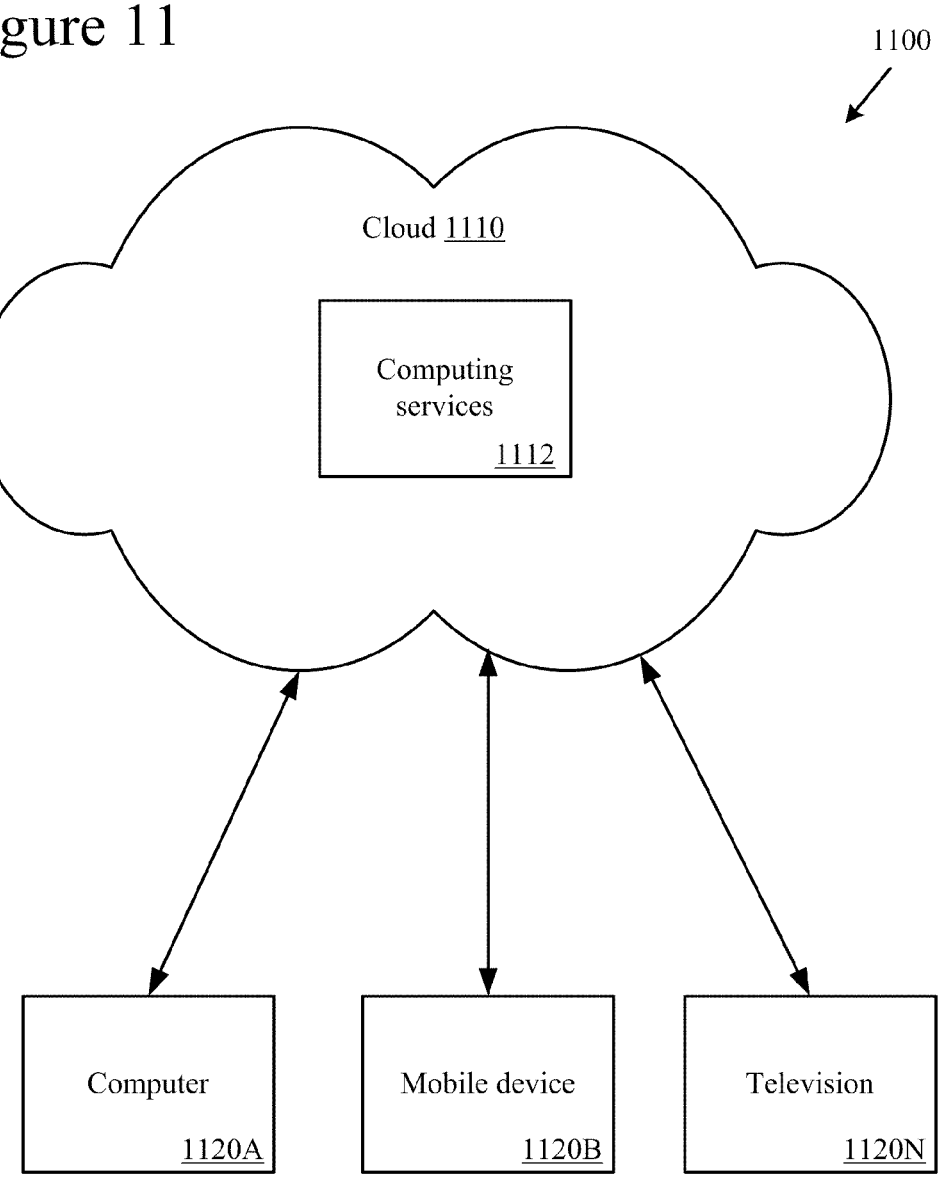
FIG. 11 illustrates a generalized example of a suitable implementation environment in which one or more described embodiments may be implemented.

FIG. 11 illustrates a generalized example of a suitable implementation environment 1100 in which described embodiments, techniques, and technologies may be implemented.

In example environment 1100, various types of services (e.g., computing services 1112) are provided by a cloud 1110. For example, the cloud 1110 can comprise a collection of computing devices, which may be located centrally or distributed, that provide cloud-based services to various types of users and devices connected via a network such as the Internet. The cloud computing environment 1300 can be used in different ways to accomplish computing tasks. For example, with reference to described techniques and tools, some tasks, such as processing user input and presenting a user interface, can be performed on a local computing device, while other tasks, such as storage of data to be used in subsequent processing, can be performed elsewhere in the cloud.

In example environment 1100, the cloud 1110 provides services for connected devices with a variety of screen capabilities 1120A-N. Connected device 1120A represents a device with a mid-sized screen. For example, connected device 1120A could be a personal computer such as desktop computer, laptop, notebook, netbook, or the like. Connected device 1120B represents a device with a small-sized screen. For example, connected device 1120B could be a mobile phone, smart phone, personal digital assistant, tablet computer, and the like. Connected device 1120N represents a device with a large screen. For example, connected device 1120N could be a television (e.g., a smart television) or another device connected to a television or projector screen (e.g., a set-top box or gaming console).

A variety of services can be provided by the cloud 1110 through one or more service providers (not shown). For example, the cloud 1110 can provide services related to mobile computing to one or more of the various connected devices 1120A-N. Cloud services can be customized to the screen size, display capability, or other functionality of the particular connected device (e.g., connected devices 1120A-N). For example, cloud services can be customized for mobile devices by taking into account the screen size, input devices, and communication bandwidth limitations typically associated with mobile devices.

V. Example Mobile Device

Figure 12:
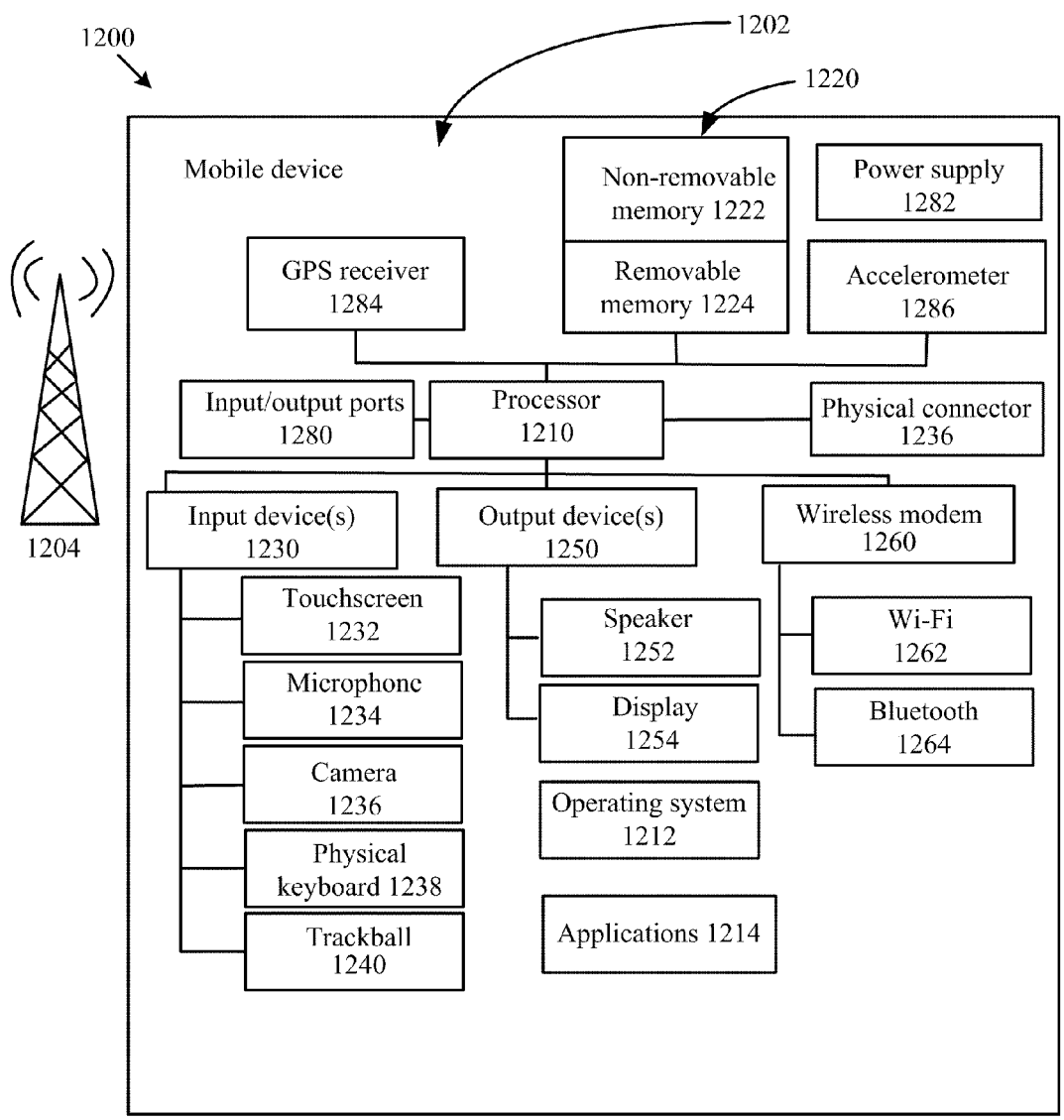
FIG. 12 illustrates a generalized example of a mobile computing device in which one or more described embodiments may be implemented.

FIG. 12 is a system diagram depicting an exemplary mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks 1204, such as a cellular or satellite network.

The illustrated mobile device can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs can include common mobile computing applications (e.g., include email applications, calendars, contact managers, web browsers, messaging applications), or any other computing application.

The illustrated mobile device can include memory 1220. Memory 1220 can include non-removable memory 1222 and/or removable memory 1224. The non-removable memory 1222 can include RAM, ROM, flash memory, a disk drive, or other well-known memory storage technologies. The removable memory 1224 can include flash memory or a Subscriber Identity Module (SIM) card, which is well known in GSM communication systems, or other well-known memory storage technologies, such as smart cards. The memory 1220 can be used for storing data and/or code for running the operating system 1212 and the applications 1214. Example data can include web pages, text, images, sound files, video data, or other data sets to be sent to and/or received from one or more network servers or other mobile devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1230, such as a touchscreen 1232, microphone 1234, camera 1236, physical keyboard 1238 and/or trackball 1240 and one or more output devices 1250, such as a speaker 1252 and a display 1254. Other possible output devices (not shown) can include a piezoelectric or other haptic output device. Some devices can serve more than one input/output function. For example, touchscreen 1232 and display 1254 can be combined in a single input/output device.

Touchscreen 1232 can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth or Wi-Fi). The wireless modem 1260 is typically configured for communication with one or more cellular networks, such as a GSM network for data and voice communications within a single cellular network, between cellular networks, or between the mobile device and a public switched telephone network (PSSTN).

The mobile device can further include at least one input/output port 1280, a power supply 1282, a satellite navigation system receiver 1284, such as a global positioning system (GPS) receiver, an accelerometer 1286, a transceiver 1288 (for wirelessly transmitting analog or digital signals) and/or a physical connector 1290, which can be a USB port, IEEE 1394 (firewall) port, and/or RS-232 port. The illustrated components 1202 are not required or all-inclusive, as components can be deleted and other components can be added.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. In a computer system, a method comprising:

displaying a graphical user interface comprising at least first, second, and third layers, wherein the third layer describes a content category, the second layer describes a content subcategory, and the first layer comprises content items included within the content subcategory, wherein a first portion of visual information in the first layer is within a display area of a touchscreen, and wherein the first layer comprises a section operable to move in a second direction substantially orthogonal to a first direction and a first-layer lock point at an edge of the section;

receiving a first user input corresponding to a first gesture on the touchscreen;

calculating a first movement based at least in part on the first user input, the first movement comprising a movement of the first layer from an initial first-layer position in which a second portion of visual information in the first layer is outside the display area to a current first-layer position in which the second portion of visual information in the first layer is within the display area, wherein the first movement is in a first direction at a first movement rate;

calculating a second movement substantially parallel to the first movement based at least in part on the first user input, the second movement comprising a movement of visual information in the second layer from an initial second-layer position to a current second-layer position, wherein the second movement is in the first direction at a second movement rate, and wherein the second layer comprises a second-layer lock point;

calculating a third movement substantially parallel to the first and second movements based at least in part on the first user input, the third movement comprising a movement of visual information in the third layer from an initial third-layer position to a current third-layer position, wherein the third movement is in the first direction at a third movement rate, wherein the third layer comprises a third-layer lock point, and wherein the first movement rate is different from at least one of the second and third movement rates;

performing a locking animation based at least in part on the lock points and the current first-layer position, wherein the locking animation comprises moving the first, second, and third layers from their respective current positions to post-locking-animation positions in which the layers have stopped moving and the edge of the section is aligned with a corresponding edge of the display area;

receiving a second user input corresponding to a second gesture on the touchscreen; and calculating a substantially orthogonal sectional movement of visual information in the second portion of visual information in the first layer that is within the display area as a result of the performed locking animation, the movement being independent from other visual information in the first, second, and third layers based at least in part on the second user input, wherein the substantially orthogonal sectional movement comprises a movement of the visual information in the second portion of visual information in the first layer from an initial section position to a current section position.

2. The method of claim 1, the first gesture having a gesture movement rate, wherein the first movement rate is based on the gesture movement rate.

3. The method of claim 2 wherein the first movement rate is substantially equal to the gesture movement rate.

4. The method of claim 1 wherein calculating the first movement comprises calculating the current first-layer position based at least in part on the initial first-layer position, the first direction, and a velocity of the first gesture, and wherein calculating the second movement comprises calculating the current second-layer position based at least in part on the calculated current first-layer position.

5. The method of claim 1 wherein a direction indicated by the first gesture differs from the first direction, wherein the direction indicated by the first gesture is a diagonal direction, and wherein the first direction is a horizontal direction.

6. The method of claim 1 wherein the first movement rate is greater than the second movement rate.

7. The method of claim 1 wherein a portion of visual information in the second layer is outside the display area when the second layer is in the initial second-layer position, and wherein the portion of the visual information in the second layer is within the display area when the second layer is in the current second-layer position.

8. The method of claim 1 wherein the graphical user interface further comprises a background layer, wherein the first layer is a content layer, wherein the second layer is a section header layer above the content layer in the display area, wherein the third layer is a title layer above the section header layer in the display area, wherein the content layer, the section header layer, and the title layer overlap the background layer, and wherein the second and third movement rates differ proportionally to a difference between a length of the title layer and a length of the section header layer.

9. The method of claim 1 wherein the first direction is a horizontal direction, and wherein the second direction is a vertical direction.

10. The method of claim 9 wherein the section comprises a vertically scrollable element.

11. The method of claim 10 wherein a direction of the second gesture differs from the vertical direction, and wherein the direction indicated by the second gesture is a diagonal direction.

12. The method of claim 10 further comprising:
performing a vertical locking animation in the vertically scrollable element, wherein the vertical locking animation comprises moving the vertically scrollable element such that a lock point in the vertically scrollable element is vertically aligned with a part of the display area.

13. The method of claim 12 wherein the vertically scrollable element is a list of items, and wherein the lock point is associated with an item in the list.

14. The method of claim 13 wherein the list of items is a list of links, and wherein the lock point is associated with a link in the list.

15. The method of claim 1 wherein calculating the substantially orthogonal sectional movement comprises:
calculating the current section position based at least in part on the initial section position and a velocity of the second gesture.

16. The method of claim 1, wherein the other visual information is adjacent in the first direction and adjacent in the second direction to the visual information in the section, wherein a portion of visual information in the section is outside the display area when the section is in the initial section position, and wherein the portion of the visual information in the section is within the display area when the section is in the current section position.

17. The method of claim 1 further comprising rendering the first movement, the second movement and the substantially orthogonal sectional movement for display on a mobile phone comprising the touchscreen.

18. A computing device comprising:
one or more processors;
a touchscreen having a display area; and
one or more computer readable storage media having stored therein computer-executable instructions for performing a method comprising:
displaying a graphical user interface comprising a content layer, a section header layer, and a title layer, wherein each layer comprises at least first and second portions of visual information in the respective layer, wherein the first portion of visual information in the respective layer is in the display area, wherein the second portion of visual information in the respective layer is outside of the display area, and wherein the content layer comprises at least one scrollable section having a first portion of visual information in the display area and a second portion of visual information outside of the display area;
receiving a first user input via the touchscreen;
calculating a content-layer movement based at least in part on the first user input, the content-layer movement comprising a movement of the content layer from (a) an initial content-layer position in which the second portion of visual information in the content layer is outside the display area, to (b) a current content-layer position in which the second portion of visual information in the content layer is within the display area, wherein the content layer further comprises a content-layer lock point at an edge of the scrollable section;
animating the movement from (a) to (b), wherein the content-layer movement is in a first direction at a content-layer movement rate;

calculating a section-header-layer movement based at least in part on the first user input, the section-header-layer movement comprising a movement of the section header layer from (c) an initial section-header-layer position in which the second portion of visual information in the section header layer is outside the display area, to (d) a current section-header-layer position in which the second portion of visual information in the section header layer is within the display area, wherein the section-header layer comprises a section header and a section-header-layer lock point at an edge of the section header;

animating the movement from (c) to (d), wherein the section-header-layer movement is in the first direction at a section-header-layer movement rate;

calculating a title-layer movement based at least in part on the first user input, the title-layer movement comprising a movement of the title layer from (e) an initial title-layer position in which the second portion of visual information in the title layer is outside the display area, to (f) a current title-layer position in which the second portion of visual information in the title layer is within the display area, wherein the title layer comprises a title and a title-layer lock point at an edge of the title;

animating the movement from (e) to (f), wherein the title-layer movement is in the first direction at a title-layer movement rate;

performing a locking animation based at least in part on the lock points and the current content-layer position, wherein the locking animation comprises moving the content layer, the section-header layer and the title layer from their respective current positions to post-locking-animation positions in which the respective layers have stopped moving and the edge of the scrollable section, the edge of the section header, and the edge of the title are aligned with a corresponding edge of the display area;

receiving a second user input via the touchscreen;

calculating a scrollable-section movement of visual information in the scrollable section of the content layer independent from other visual information in the content layer based at least in part on the second user input, the scrollable-section movement comprising a movement of visual information in the scrollable section from (g) an initial scrollable-section position in which the second portion of visual information in the scrollable section is outside of the display area, to (h) a current scrollable-section position in which the second portion of visual information in the scrollable section is within the display area; and animating the movement from (g) to (h), wherein the scrollable-section movement is in the second direction wherein the title-layer movement rate differs from the content-layer movement rate and from the section-header-layer movement rate, and wherein the content layer, the section header layer and the title layer are substantially parallel to each other and non-overlapping with respect to each other.

19. The computing device of claim 18 wherein the first user input corresponds to a first gesture on the touchscreen, and wherein the second user input corresponds to a second gesture on the touchscreen.

20. One or more computer memory devices having stored thereon computer-executable instructions for performing a method comprising:

displaying a graphical user interface on a touchscreen operable to receive user input via gestures on the touchscreen, the graphical user interface comprising a content layer, a section header layer, a title layer and a background layer, wherein each layer comprises at least first and second portions of visual information in the respective layer, wherein the first portion of visual information in the respective layer is in a display area of the touchscreen, wherein the second portion of visual information in the respective layer is outside of the display area, and wherein the content layer comprises at least one scrollable section having a first portion of visual information in the display area and a second portion of visual information outside of the display area;

receiving a first user input corresponding to a gesture on the touchscreen;

calculating a content-layer movement based at least in part on the first user input, the content-layer movement comprising a movement of the content layer from (a) an initial content-layer position in which the second portion of visual information in the content layer is outside the display area, to (b) a current content-layer position in which the second portion of visual information in the content layer is within the display area, wherein the content layer further comprises a content-layer lock point at an edge of the scrollable section;

animating the movement from (a) to (b), wherein the content-layer movement is in a first direction at a content-layer movement rate;

calculating a section-header-layer movement based at least in part on the first user input, the section-header-layer movement comprising a movement of the section header layer from (c) an initial section-header-layer position in which the second portion of visual information in the section header layer is outside the display area, to (d) a current section-header-layer position in which the second portion of visual information in the section header layer is within the display area, wherein the section-header layer further comprises a section header and a section-header-layer lock point at an edge of the section header;

animating the movement from (c) to (d), wherein the section-header-layer movement is in the first direction at a section-header-layer movement rate;

calculating a title-layer movement based at least in part on the first user input, the title-layer movement comprising a movement of the title layer from (e) an initial title-layer position in which the second portion of visual information in the title layer is outside the display area, to (f) a current title-layer position in which the second portion of visual information in the title layer is within the display area, wherein the title layer further comprises a title and a title-layer lock point at an edge of the title;

animating the movement from (e) to (f), wherein the title-layer movement is in the first direction at a title-layer movement rate;

calculating a background-layer movement based at least in part on the first user input, the background-layer movement comprising a movement of the background layer from (g) an initial background-layer position in which the second portion of visual information in the background layer is outside the display area, to (h) a current background-layer position in which the second portion of visual information in the background layer is within the display area;

animating the movement from (g) to (h), wherein the background-layer movement is in the first direction at a background-layer movement rate;

performing a locking animation based at least in part on the lock points and the current content-layer position, wherein the locking animation comprises moving the content layer, the section-header layer and the title layer from their respective current positions to post-locking-animation positions in which the respective layers have stopped moving and the edge of the scrollable section, the edge of the section header, and the edge of the title are aligned with a corresponding edge of the display area;

receiving a second user input corresponding to a second gesture on the touchscreen;

calculating a scrollable-section movement of visual information in the scrollable section of the content layer independent from other visual information in the content layer based at least in part on the second user input, the scrollable-section movement comprising a movement of visual information in the scrollable section from (i) an initial scrollable-section position in which the second portion of visual information in the scrollable section is outside of the display area, to (j) a current scrollable-section position in which the second portion of visual information in the scrollable section is within the display area; and animating the movement from (i) to (j), wherein the scrollable-section movement is in the second direction;

wherein the content-layer movement rate is equal to the section-header-layer movement rate, wherein the title-layer movement rate differs from the content-layer movement rate and from the section-header-layer movement rate, wherein the content layer, the section header layer and the title layer are substantially parallel to each other and non-overlapping with respect to each other, and wherein each of the content layer, the section header layer and the title layer overlaps the background layer.

* * * * *